us007602526B2

United States Patent
Kadono et al.

(10) Patent No.: US 7,602,526 B2
(45) Date of Patent: Oct. 13, 2009

(54) PICTURE CODING METHOD

(75) Inventors: Shinya Kadono, Nishinomiya (JP); Youji Notoya, Neyagawa (JP)

(73) Assignee: Panasonic Corporation, Osaka (JP)

( * ) Notice: Subject to any disclaimer, the term of this patent is extended or adjusted under 35 U.S.C. 154(b) by 651 days.

(21) Appl. No.: 10/528,151

(22) PCT Filed: Dec. 9, 2003

(86) PCT No.: PCT/JP03/15699

§ 371 (c)(1),
(2), (4) Date: Mar. 17, 2005

(87) PCT Pub. No.: WO2004/066633

PCT Pub. Date: Aug. 5, 2004

(65) Prior Publication Data

US 2006/0056705 A1    Mar. 16, 2006

(30) Foreign Application Priority Data

Jan. 17, 2003 (JP) ............................. 2003-010233
Jan. 20, 2003 (JP) ............................. 2003-010551

(51) Int. Cl.
*H04N 1/40* (2006.01)
(52) U.S. Cl. .............. 358/1.9; 358/426.02; 382/236
(58) Field of Classification Search ........... 358/1.9, 358/539, 426.02–426.11; 382/232, 236; 348/420.1, 421.1
See application file for complete search history.

(56) References Cited

U.S. PATENT DOCUMENTS 6,031,960 A    2/2000 Lane et al.
2002/0145702 A1    10/2002 Kato et al.

FOREIGN PATENT DOCUMENTS

| EP | 0 613 300 | 12/1993 |
|----|-----------|---------|
| EP | 1 385 337 | 1/2004 |
| JP | 6-217281 | 8/1994 |
| JP | 2000-152236 | 5/2000 |
| JP | 2001-285800 | 10/2001 |
| JP | 2002-10186 | 1/2002 |
| JP | 2002-10213 | 1/2002 |
| JP | 2002-158974 | 5/2002 |

OTHER PUBLICATIONS

Wenger, S. et al., "*H. 26L Over IP and H.324 Framework*", ITU Telecommunications Standardization Sector VCEG-N52, Sep. 18, 2001, pp. 1-13, XP001148203.

(Continued)

*Primary Examiner*—Thomas D Lee
*Assistant Examiner*—Stephen M Brinich
(74) *Attorney, Agent, or Firm*—Wenderoth, Lind & Ponack, L.L.P.

(57) ABSTRACT

A picture coding method according to the present invention includes: a coding step (S102, S103) of coding, picture parameter sets (PPS) to be used for decoding all the pictures (pic) included in a random access unit (RAU) made up of plural pictures and a sequence parameter set (SPS); and a parameter set placement step (S104) of placing, in the random access unit (RAU), the parameter set (PPS, SPS) coded in the coding step (S102, S103).

4 Claims, 18 Drawing Sheets

OTHER PUBLICATIONS

Stockhammer, T., et al., "*H.26L/JVT Coding Network Abstraction Layer and IP-Based Transport*", Proceedings 2002 International Conference on Image Processing. ICIP 2002. Rochester, NY, Sep. 22-25, 2002, International Conference on Image Processing, New York, NY: IEEE, US, vol. 2 of 3, Sep. 22, 2002, pp. 485-488, XP002227244.

Suzuki, T., et al., "*Group of Pictures for JVT Codec*", Joint Video Team (JVT) of ISO/IEC MPEG & ITU-T VCEG, XX, XX, vol. JVT-B069, Jan. 29, 2002, pp. 1-7, XP001148206.

PICTURE CODING METHOD

TECHNICAL FIELD

The present invention relates to a picture coding method for coding a picture.

BACKGROUND ART

Recently, with an arrival of the age of multimedia which handles integrally audio, video and pixel values of others, existing information media, i.e., newspapers, journals, TVs, radios and telephones and other means through which information is conveyed to people, has come under the scope of multimedia.

Generally speaking, multimedia refers to a representation in which not only characters but also graphics, audio and especially pictures and the like are related to each other. However, in order to include the aforementioned existing information media in the scope of multimedia, it appears as a prerequisite to represent such information in digital form.

However, when calculating the amount of information contained in each of the aforementioned information media as the amount of digital information, the information amount per character requires 1-2 bytes whereas the audio requires more than 64 Kbits (telephone quality) per second and when it comes to the moving picture, it requires more than 100 Mbits (present television reception quality) per second. Therefore, it is not realistic to handle the vast information directly in digital form via the information media mentioned above. For example, a videophone has already been put into practical use via Integrated Services Digital Network (ISDN) with a transmission rate of 64 Kbit/s-1.5 Mbit/s, however, it is impossible to transmit video captured on the TV screen or shot by a TV camera.

This therefore requires information compression techniques, and for instance, in the case of the videophone, video compression techniques compliant with H.261 and H.263 standards internationally standardized by International Telecommunication Union-Telecommunication Standardization Sector ( ITU-T) are employed. According to the information compression techniques compliant with the MPEG-1 standard, picture information as well as audio information can be stored in an ordinary music CD (Compact Disc).

The Moving Picture Experts Group (MPEG) is an international standard for a compression of moving picture signals and MPEG-1 is a standard that compresses video signals down to 1.5 Mbit/s, namely, to compress the information included in TV signals approximately down to a hundredth. The quality targeted in the MPEG-1 standard was the medium quality so as to realize a transmission rate primarily of about 1.5 Mbit/s, therefore, MPEG-2, standardized with the view to meet the requirements of high-quality picture realizes a TV broadcast quality for transmitting moving picture signals with a transmission rate of 2-15 Mbit/s. In the present circumstances, a working group (ISO/IEC JTC1/SC29/WG11) previously in the charge of the standardization of the MPEG-1 and the MPEG-2 has standardized MPEG-4 which achieves a compression rate superior to the one achieved by the MPEG-1 and the MPEG-2, allows coding/decoding operations on a per-object basis and realizes a new function required by the era of multi media. At first, in the process of the standardization of the MPEG-4, the standardization of a coding method for a low bit rate was aimed, however, the aim is presently extended to a more versatile coding including a coding of moving pictures at a high bit rate and a coding of interlace pictures. Moreover, a standardization of MPEG-4 AVC and ITU H.264 is in process as a next generation coding method with a higher compression rate, jointly worked by the ITU-T and the ISO/IEC. The next generation coding method is published under the name of Committee Draft (CD) as of August 2002.

In coding of a moving picture, compression of information volume is usually performed by eliminating redundancy both in spatial and temporal directions. Therefore, inter-picture prediction coding, which aims at reducing the temporal redundancy, estimates a motion and generates a predictive picture on a block-by-block basis with reference to forward and backward pictures, and then codes a differential value between the obtained predictive picture and a current picture to be coded. Here, "picture" is a term to represent a single screen and it represents a frame when used for a progressive picture whereas it represents a frame or a field when used for an interlaced picture. The interlaced picture here is a picture in which a single frame consists of two fields having different time. For coding and decoding an interlaced picture, three ways are possible: handling a single frame either as a frame, as two fields or as a frame structure or a field structure depending on a block in the frame.

A picture to which intra-picture prediction coding is performed without reference pictures is called I-picture. A picture to which inter-picture prediction coding is performed with reference to a single picture is called P-picture. A picture to which inter-picture prediction coding is performed by referring simultaneously to two pictures is called B-picture. Two pictures whose display time is either forward or backward to that of a current picture to be coded can be selected arbitrarily as reference for coding B-picture. The reference pictures can be specified for each block which is a basic unit for coding and decoding, but they can be classified as the first reference picture for a reference picture that is described first in a coded bit stream and a picture that is described later as the second reference picture. However, the reference pictures need to be already coded or decoded as a condition to code or decode these I, P and B pictures.

A motion compensation inter-picture prediction coding is employed for coding P-pictures or B-pictures. The motion compensation inter-picture prediction coding is a coding method applying motion compensation to inter-picture prediction coding. The motion compensation is not a method to simply predict motions using pixels in the reference pictures but to estimate a motion (to be referred to as "motion vector" hereinafter) at each part within a picture and improve prediction accuracy by performing prediction that takes the motion vector into consideration as well as to reduce the data amount. For example, the amount of data is reduced by estimating the motion vector for a current picture to be coded and coding prediction error between a predictive value, which is obtained after being shifted for the amount equivalent to the motion vector, and the current picture. In the case of using this method, information on motion vectors is required at the time of decoding, therefore, the motion vectors are coded and then recorded or transmitted.

A motion vector is estimated on a block-by-block basis. More precisely, a motion vector is estimated by fixing a block in the current picture, then, shifting a block in the reference picture within a range of search, and finding out a location of the reference block that resembles a basic block.

FIG. 1 is a block diagram showing the structure of the conventional picture coding apparatus.

A picture coding apparatus 900 outputs a coded image signal (to be referred to as "bit stream") Str9 which is a bit stream obtained by coding an image signal Vin on a picture-by-picture basis, and includes a motion estimation unit 903, a motion compensation unit 905, a subtractor 906, an orthogonal transformation unit 907, a quantization unit 908, an inverse quantization unit 910, an inverse orthogonal transformation unit 911, an adder 912, a picture memory 904, a switch 913, a variable length coding unit 909 and an access point determination unit 902. Each component such as the motion estimation unit 903 executes the following processing per block or per macroblock that constitutes a picture.

The subtractor 906 calculates a differential value between the image signal Vin and a predictive image Pre and outputs the differential value to the orthogonal transformation unit 907. The orthogonal transformation unit 907 transforms the differential value into frequency coefficients and outputs them to the quantization unit 908. The quantization unit 908 quantizes the frequency coefficients and outputs the quantized values to the variable length coding unit 909. The inverse quantization unit 910 restores the frequency coefficients by inversely quantizes the quantized values and outputs the frequency coefficients to the inverse orthogonal transformation unit 911.

The inverse orthogonal transformation unit 911 performs inverse frequency transformation on the frequency coefficients outputted from the inverse quantization unit 910 into pixel differential values and outputs them to the adder 912. The adder 912 adds the pixel differential values outputted from the inverse orthogonal transformation unit 911 and the predictive image Pre outputted from the motion compensation unit 905, and generates a decoded image. The switch 913 connects the adder 912 and the picture memory 904 so that the picture memory 904 stores the decoded image generated by the adder 912. The decoded image stored in the picture memory is simply referred to as "picture" hereinafter.

The motion estimation unit 903 refers to the picture stored in the picture memory 904 as a reference picture and specifies an image area that resembles the image signal Vin the most among the reference pictures. Then, the motion estimation unit 903 estimates a motion vector MV indicating a position of the image area.

The motion estimation unit 903 also identifies a reference picture that resembles the image signal Vin out of the plural reference pictures using identification numbers (relative index Idx) for identifying the reference picture.

The motion compensation unit 905 extracts an image area that is the most applicable to the predictive image Pre from among the pictures stored in the picture memory 904 using the motion vector MV and the relative index Idx. The motion compensation unit 905 then generates a predictive image Pre from the extracted image area.

The access point determination unit 902 instructs the motion estimation unit 903 and the motion compensation unit 905 to code (intra-picture code) per predetermined unit (random access unit) a predetermined picture as a special picture. The special picture here means a picture from which the decoding can be started in the stream Str 9. Furthermore, the access point determination unit 902 outputs an access point identifier rapp indicating that a picture is the special picture to the variable length coding unit 909.

The variable length coding unit 909 codes a parameter set PS obtained from outside resources, the motion vector MV, the quantized values, the relative index Inx and the access point identifier rapp, generates a stream Str9 in which the coded parameter set is placed only at the head side, and outputs the stream Str9.

FIG. 2 is a structural diagram showing the structure of the stream Str9 outputted by the conventional picture coding apparatus 900.

The stream Str9 includes sequentially from the head a synchronous signal sync, a parameter set PS, plural random access units RAU9. Such stream Str9 complies with the JVT (H.264/MPEG-4 AVC) which is presently in process of standardization, jointly worked by the ITU-T and the ISO/IEC.

The parameter set PS is common data equivalent to a header and includes a picture parameter set PPS is equivalent to a header of the picture, a sequence parameter set SPS equivalent to a header of a unit with a level superior to a random access unit RAU9. The sequence parameter set SPS includes a maximum possible number of reference pictures, a picture size, or the like, whereas the picture parameter set PPS includes a type of variable length coding (a switching between Huffman coding and arithmetic coding), an initial value in the quantization step, the number of reference pictures, or the like.

The random access unit RAU9 includes sequentially from the head a synchronous signal sync and a plurality of coded pictures pic. The random access unit RAU9 as such is a single unit including the plural pictures in the stream Str9 and includes the special picture as mentioned above which can be decoded without depending on other pictures. Namely, the random access unit RAU9 is obtained by dividing the stream Str9 into a group of plural pictures including a special picture.

The picture pic includes sequentially from the head a synchronous signal sync and a parameter set identifier PSID and plural pieces of pixel data pix.

The parameter set identifier PSID indicates the sequence parameter set SPS and the picture parameter set PPS, which are included in the parameter set PS, to be referred to by the picture pic.

The synchronous signal sync included in the head of the stream Str9, in the head of the random access unit RAU9 and in the head of the picture pic indicates respectively a section distinguishing the units such as the stream Str9, the random access unit RAU9 and the picture pic.

Namely, in the picture coding method in which the conventional picture coding apparatus 900 generates a stream Str9 by coding the image signal Vin, a stream Str9 is generated in such a way that the parameter set PS is coded together and then placed at the head side of the stream Str9, whereas plural random access units RAU9, each of which does not include a picture parameter set PPS and a sequence parameter set SPS, follows the parameter set PS.

When decoding such stream Str9, the picture decoding apparatus refers to the sequence parameter set SPS and the picture parameter set PPS included in the parameter set PS indicated by the parameter set identifier PSID in the picture pic so as to decode the picture pic.

A conventional stream according to MPEG-2 has a structure different from the stream Str9.

FIG. 3 is a structural diagram showing the structure of the conventional stream according to the MPEG-2.

A stream Str8 according to the MPEG-2 includes sequentially from the head a synchronous signal sync, a header hed that is common data in the stream Str8 and a plurality of groups of pictures GOP.

The group of picture GOP includes sequentially from the head a synchronous signal sync, a header hed that is common data for the group of pictures GOP and plural coded pictures pic.

The group of picture GOP as such is a basic unit for coding and is used for editing a moving picture and performing random access. The picture pic included in the group of picture GOP is either I-picture, P-picture or B-picture.

The picture pic includes sequentially from the head a synchronous signal sync, a header that is data common to the pictures pic and plural pieces of pixel data pix.

Namely, in the picture coding method according to the MPEG-2 for generating a stream Str8 by coding the conventional image signal Vin, a stream Str8 is generated in such a way that the header hed necessary for decoding the picture pic is included respectively in the heads of the stream Str8, each group of picture GOP and each picture pic.

However, a problem is that the picture decoding apparatus cannot decode from a random access point that is a head of the random access unit RAU9 in the stream Str9 (i.e. random access) in an attempt to start performing random access, for example, in the case where the parameter set PS cannot be obtained since the stream Str9 is read out from the middle, as the parameter set PS is placed in one place at the head side of the stream Str9 according to the conventional picture coding method as described above, employed by the picture coding apparatus 900. Namely, the picture decoding apparatus cannot decode the picture pic properly because the corresponding picture parameter set PPS and sequence parameter set SPS are not found.

More precisely, the stream Str9 cannot be decoded from the middle when the picture decoding apparatus has read in the stream Str9 from the middle under the circumstance where the stream is incessantly transmitted as in a case of broadcasting or delivery.

In the case where the stream Str9 is recorded on a recording medium such as a tape or a disk, the picture decoding apparatus firstly has to read the parameter set PS placed in the head of the stream Str9 on the recording medium and then start reading the stream Str9 from the random access point in the attempt to start performing random access for the stream Str9. That is to say that the picture decoding apparatus has to shift the position of reading the data from the head of the stream Str9 to the random access point, and thereby, a prompt random access cannot be operated since the shifting time becomes a waiting time for the random access.

In the case where the recording medium is a tape, it is apparent that the waiting time is very long, and even if the disk is capable of high-speed reading, the waiting time may be prolonged to several seconds, which cannot be ignored.

The picture decoding apparatus can perform random access for each group of picture GOP on the stream Str8 generated using the picture coding method according to the MPEG-2 by using the header hed in the group of picture GOP and the header hed in each picture pic.

With the use of the picture coding method for generating such stream Str8, however, the compression rate of the stream Str8 is low since each of the pictures pic included in the group of picture GOP has a header hed and many of such headers hed have the same value as other headers hed. That is to say, the picture coding method for generating a stream Str8 allows a generation of a stream Str8 to which random access can be performed, on one hand, however, decreases the coding efficiency on the other.

DISCLOSURE OF INVENTION

The present invention is therefore conceived in view of the above circumstances, and an object of the present invention is to provide the picture coding method for coding a picture so that a prompt random access can be operated without reducing the coding efficiency.

In order to achieve the above object, the picture coding method according to the present invention for coding a picture signal on a picture-by-picture basis so as to generate a bit stream comprises: a coding step of coding a parameter set to be used for decoding all pictures included in an access unit made up of a plurality of pictures; and a parameter set placement step of placing, in each access unit in the bit stream, the parameter set coded in the coding step.

Thus, even in the case of obtaining such bit stream in the middle of the stream, the picture decoding apparatus can decode properly the pictures included in the access unit using the parameter set included in the obtained first access unit. As a result, the bit stream can be decoded properly starting from the access unit. Such bit stream is recorded in a recording medium, therefore, even in the case of performing random access on the bit stream, the picture decoding apparatus can start random access promptly, without shifting the position of reading out the data, from the head of the bit stream to the starting position of the random access, unlike the conventional example. Moreover, the redundancy of the bit stream can be reduced and the decrease in the coding efficiency can be prevented since the information used for decoding pictures is not placed for each picture in the bit stream.

The picture coding method may further comprise a structure identification information generation step of generating structure identification information indicating a placement of the parameter set.

Thus, the placement of the parameter set is indicated in the structure identification information. The picture decoding apparatus can therefore execute random access with a recognition that a precise and prompt random access can be performed for the bit stream on the access basis, by referring to the structure identification information.

The parameter set includes a plurality of the picture parameter sets, and in the parameter set placement step, a picture parameter set for a picture is placed immediately before the picture in the access unit in the bit stream, except for a picture parameter set that is already placed.

Thus, the coded picture parameter set is placed immediately before the corresponding picture so that each picture parameter set can be coded and sequentially placed, which does not require the storage of the coded picture parameter sets. Therefore, the picture coding apparatus can be structured easily.

In the coding step, either any or all of the picture parameter sets are coded for plural times, and a plurality of same coded picture parameter sets are generated, and in the parameter set placement step, the plurality of same picture parameter sets coded in the coding step are placed in the same access unit.

Thus, a plurality of the same picture parameters are included in the access unit, therefore, it is possible to decode the bit stream thus coded, while preventing the occurrence of errors.

The picture coding apparatus according to the present invention codes a picture signal on a picture-by-picture basis and generating a bit stream and comprises: a coding step of coding a parameter set to be used for decoding all pictures included in an access unit, except for a picture which refers to a picture in another access unit and is not displayed when random access is performed, the access unit being made up of a plurality of pictures; and a parameter set placement step of placing, in each access unit in the bit stream, the parameter set coded in the coding step.

Thus, the parameter set is included in the bit stream for each access unit. Therefore, even in the case of obtaining such bit stream in the middle of the stream, the picture decoding apparatus can decode a current picture to be displayed included in the access unit using the parameter set included in the first access unit obtained. Consequently, the bit stream can be decoded starting from the access unit. Such bit stream is recorded in a recording medium. Therefore, even in the case of performing random access on the bit stream, the picture decoding apparatus can start random access promptly, without shifting the position of reading out the data, from the head of the bit stream to the starting position of the random access, unlike the conventional case. Moreover, the redundancy of the bit stream can be reduced and the decrease in the coding efficiency can be prevented since the information used for decoding pictures is not placed for each picture in the bit stream.

The present invention can be realized also as a picture coding apparatus or a program which uses the picture coding method as described above, or even as a bit stream generated using the picture coding method.

BEST MODE FOR CARRYING OUT THE INVENTION

The following describes the embodiments of the present invention with reference to the figures.

First Embodiment

Figure 1:
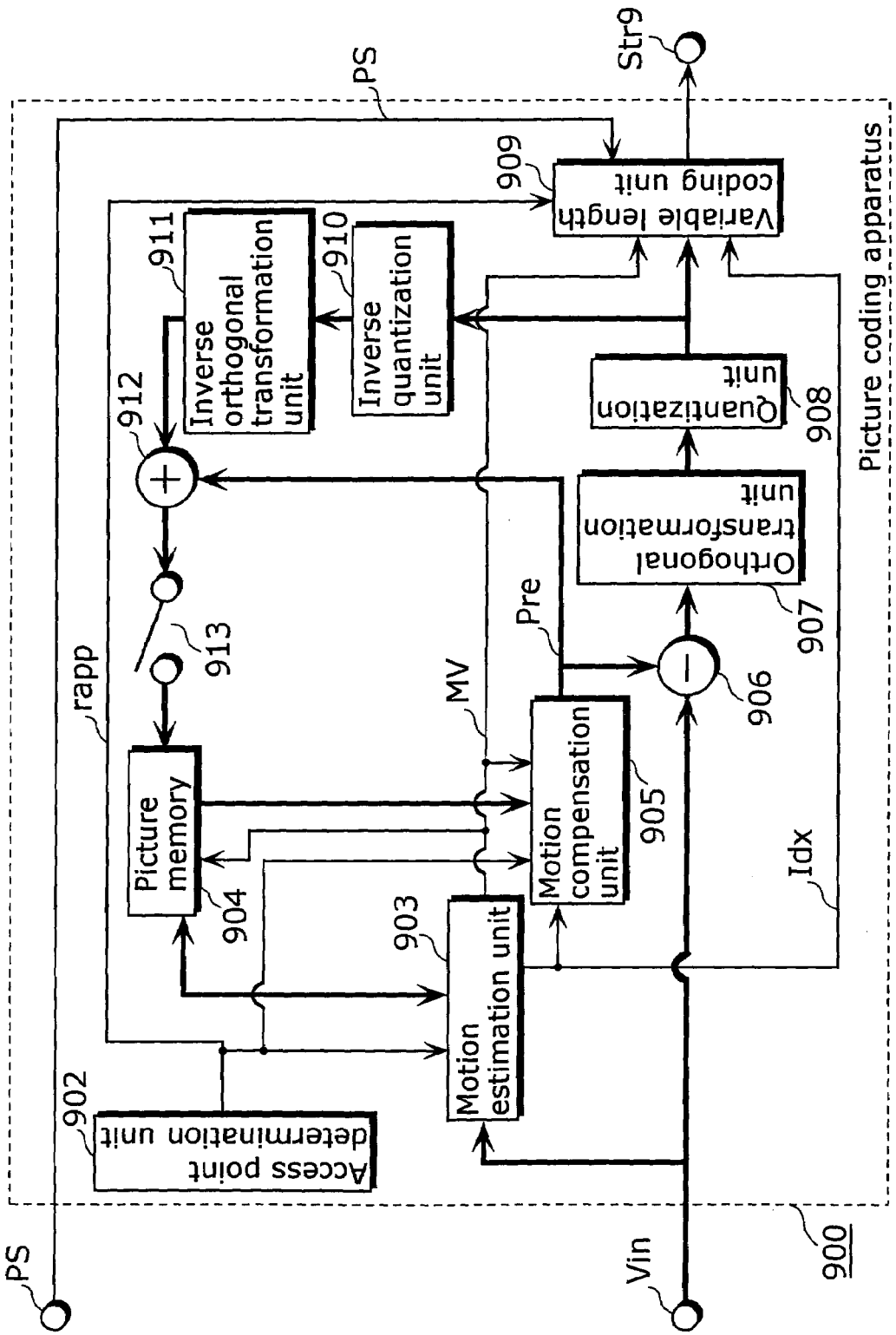
FIG. 1 is a block diagram showing a structure of the conventional picture coding apparatus.
Figure 2:
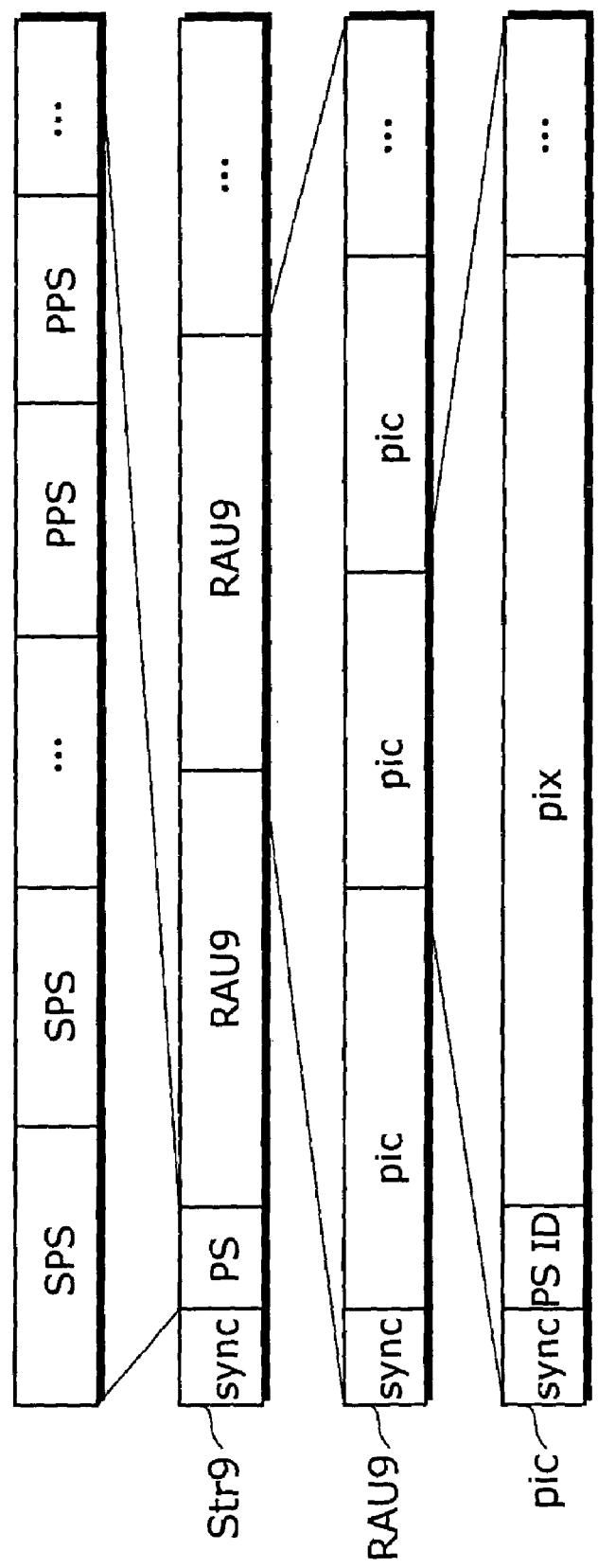
FIG. 2 is a structural diagram showing a structure of the stream outputted by the conventional picture coding apparatus.
Figure 3:
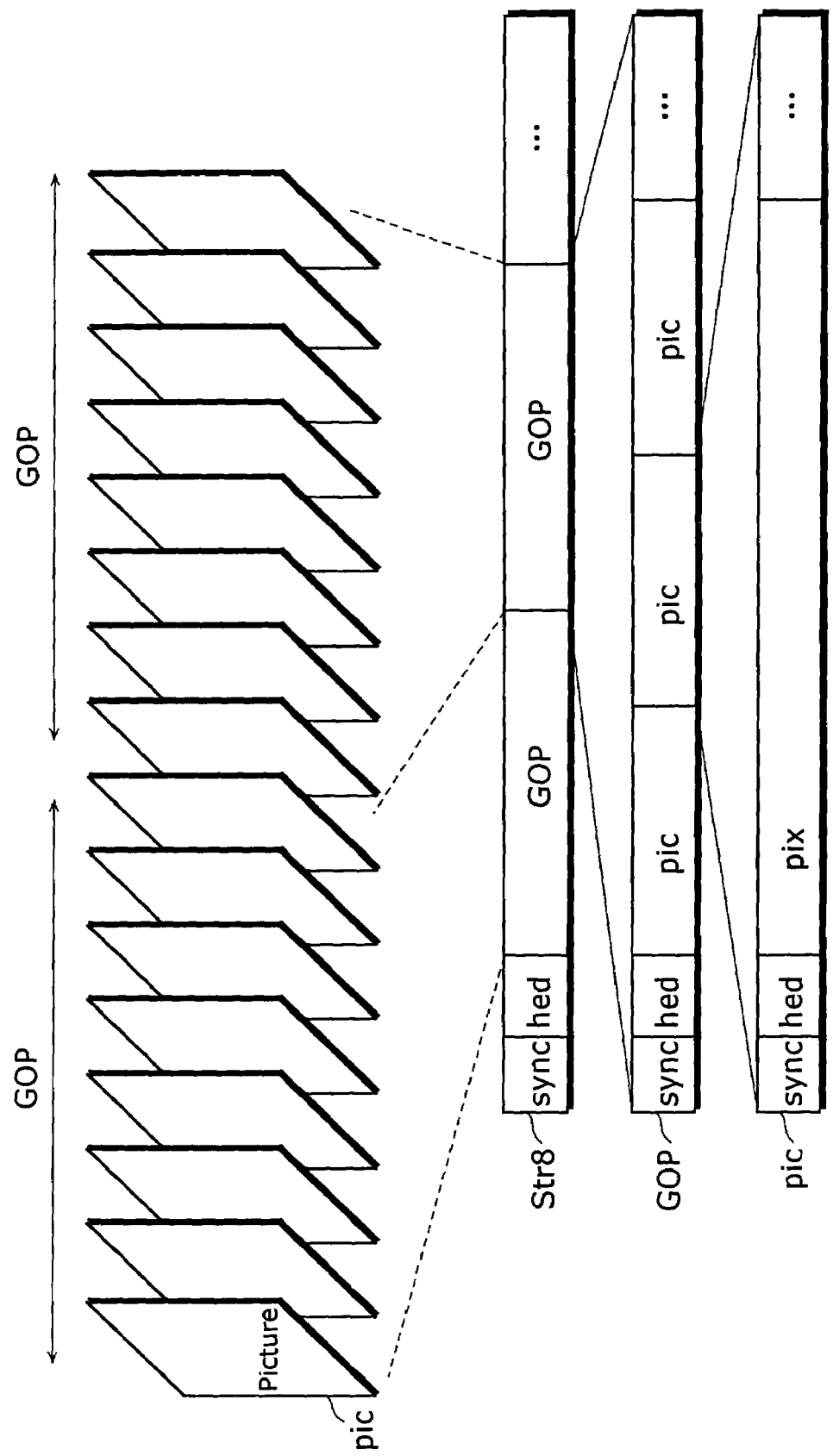
FIG. 3 is a structural diagram showing a structure of the stream according to the MPEG-2.
Figure 4:
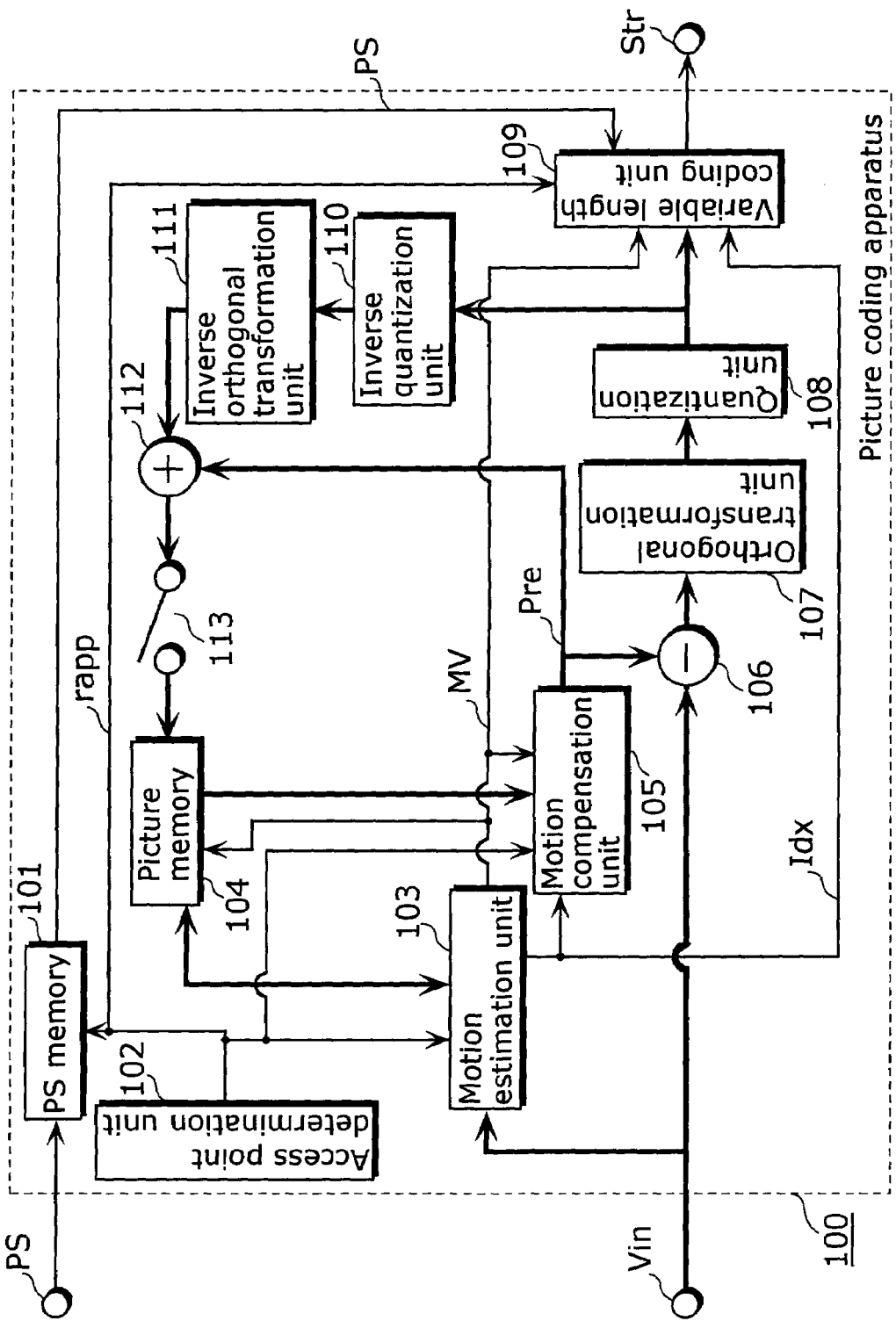
FIG. 4 is a block diagram showing a structure of the picture coding apparatus according to the first embodiment of the present invention.

FIG. 4 is a block diagram showing a structure of the picture coding apparatus according to the first embodiment of the present invention.

The picture coding apparatus 100 according to the present embodiment codes a picture so that a prompt random access can be operated without reducing the coding efficiency. More precisely, the picture coding apparatus 100 codes an image signal Vin on a picture-by-picture basis and outputs a stream Str.

The picture coding apparatus 100 includes a motion estimation unit 103, a motion compensation unit 105, a subtractor 106, an orthogonal transformation unit 107, a quantization unit 108, an inverse quantization unit 110, an inverse orthogonal transformation unit 111, an adder 112, a picture memory 104, a switch 113, a variable length coding unit 109, an access point determination unit 102 and a PS memory 101. Each of the components such as the motion estimation unit 103 executes the following processing per block or per macroblock that constitutes a picture.

The subtractor 106 obtains an image signal Vin, and also, a predictive image Pre from the motion compensation unit 105, and calculates a differential between the image signal Vin and the predictive image Pre. The subtractor 106 then outputs the differential value to the orthogonal transformation unit 107.

The orthogonal transformation unit 107 transforms the differential value into frequency coefficients and outputs them to the quantization unit 108.

The quantization unit 108 quantizes the frequency coefficients obtained from the orthogonal transformation unit 107, and outputs the quantized values to the variable length coding unit 109.

The inverse quantization unit 110 restores the quantized values obtained from the quantization unit 108 into the frequency coefficients by means of inverse quantization, and outputs them to the inverse orthogonal transformation unit 111.

The inverse orthogonal transformation unit 111 performs inverse frequency transformation on the frequency coefficients outputted from the inverse quantization unit 110 in order to transform them into pixel differential values, and outputs them to the adder 112.

The adder 112 adds the pixel differential values outputted from the inverse transformation unit 111 and the predictive image Pre outputted from the motion compensation unit 105, so as to generate a decoded image.

In the case where an instruction to store the decoded image generated by the adder 112 is received, the switch 113 connects the adder 112 and the picture memory 104, and allows the decoded image generated by the adder 112 to be stored in a picture memory. The decoded image stored in the picture memory is simply referred to as "picture".

The motion estimation unit 103 obtains the image signal Vin on a macroblock-by-macroblock basis. The motion estimation unit 103, having obtained the image signal Vin, refers to the picture stored in the picture memory 104 as a reference picture, and specifies a picture area that resembles the obtained image signal Vin the most within the reference picture. The motion estimation unit 103 then estimates a motion vector MV indicating a location of the image area.

The motion estimation unit 103 estimates such motion vector MV in units of blocks, each being obtained by further dividing a macroblock. The motion estimation unit 103, then, by using identification numbers (relative index Idx) for identifying the reference pictures, identifies the reference picture that has been referred to among plural reference picture candidates, based on the picture numbers assigned to each of the pictures stored in the picture memory 104.

The motion compensation unit 105 extracts an image area that is the most applicable for the predictive image Pre from among the pictures (decoded images) stored in the picture memory 104, using the motion vector MV estimated in the above processing as well as the relative index Idx. The motion compensation unit 105 then generates a predictive image Pre using the extracted image area.

The access point determination unit 102 instructs the motion estimation unit 103 and the motion compensation unit 105 to code (intra-picture code) a predetermined picture as a special picture per predetermined unit (i.e. random access unit). The access point determination unit 102 further outputs an access point identifier rapp indicating that a picture is the special picture to the variable length coding unit 109.

The PS memory 101 obtains the parameter set PS and temporarily stores it. The PS memory 101 then outputs, based on the instruction from the access point determination unit 102, a picture parameter set and a sequence parameter set of the picture indicated in the instruction from the temporarily stored parameter sets PS to the variable length coding unit 109.

The variable length coding unit 109 codes the parameter set PS obtained from outside resources, the motion vector MV, the quantized values, the relative index Idx and the access point identifier rapp. The variable length coding unit 109 then generates a stream Str by arranging for each random access unit the sequence parameter set as well as the sequence parameter set included in the coded parameter set PS, and outputs the stream Str.

Figure 5:
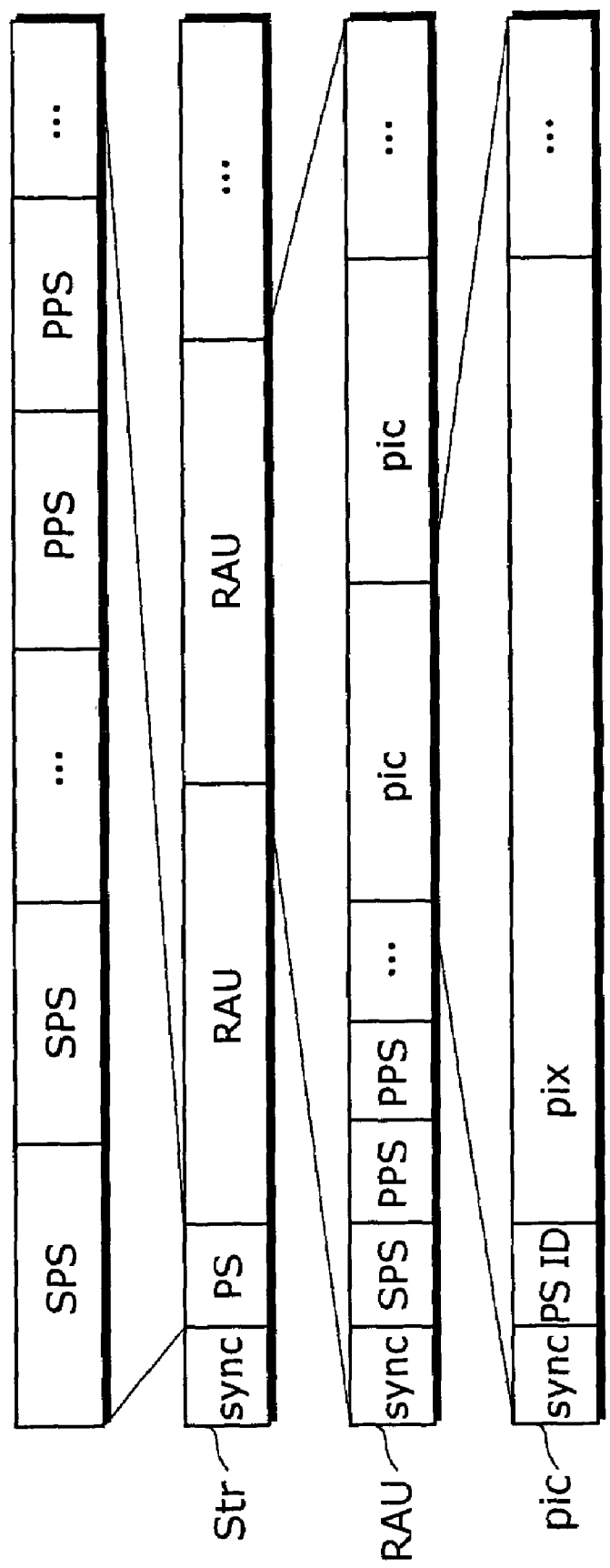
FIG. 5 is a structural diagram showing the structure of the coded image signal outputted by the picture coding apparatus according to the first embodiment of the present invention.

FIG. 5 is a structural diagram showing a structure of the stream Str outputted by the picture coding apparatus 100 according to the present embodiment.

The stream Str includes sequentially from the head a synchronous signal sync, a parameter set PS and plural random access units RAU.

The parameter set PS includes plural sequence parameter sets SPS and plural picture parameter sets PPS.

The random access unit RAU includes sequentially from the head a synchronous signal sync, a single sequence parameter set SPS, plural picture parameter sets PPS and plural coded pictures pic. Namely, such random access unit RAU includes all the sequence parameter sets SPS and the picture parameter sets PPS necessary for decoding all the pictures pic included there. Each of the picture parameter set PPS has a different value and any one of the picture parameter sets PPS is referred to by plural pictures pic and used for decoding the pictures.

The picture pic includes sequentially from the head a synchronous signal sync, a parameter set identifier PSID and pixel data pix that is a codeword for pixels of the picture.

The parameter set identifier PSID identifies the parameter sets SPS and PPS to be referred to by the picture from among the parameter sets SPS and PPS included in the random access unit RAU.

Figure 6:
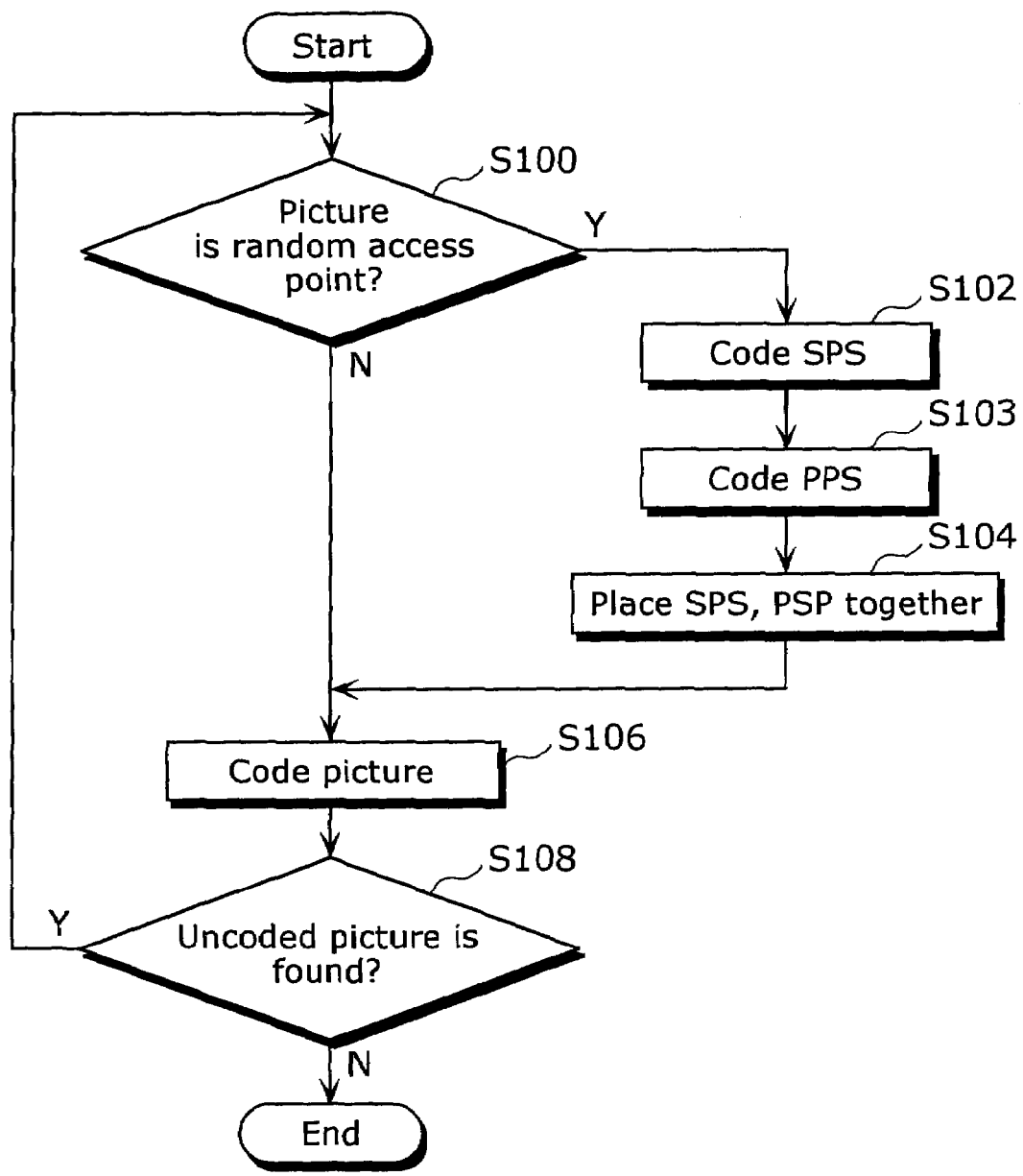
FIG. 6 is a flowchart showing the picture coding method according to the first embodiment of the present invention.

FIG. 6 is a flowchart showing a picture coding method of the picture coding apparatus 100 according to the present embodiment.

The picture coding apparatus 100 firstly judges whether or not a current picture to be coded is a random access point, namely, the first picture in the random access unit RAU (Step S100).

When judging that the current picture is a random access point (Y in Step S100), the picture coding apparatus 100 codes the sequence parameter set SPS (Step S102) and further codes each picture parameter set PPS for all the pictures in the random access unit RAU (Step S103). The picture coding apparatus 100 then places the coded sequence parameter set SPS and plural picture parameter sets PPS together at the head side of the random access unit RAU (Step S104).

The picture coding apparatus 100 codes the current picture (Step S106) either after placing the sequence parameter set SPS and the picture parameter sets PPS in Step S104 or when it is judged that the current picture is not a random access point (N in Step S100). The picture coding apparatus 100 places the coded current picture after the sequence parameter set SPS and the picture parameter sets PPS mentioned above. Namely, when the parameter sets SPS, PPS mentioned above are arranged in Step S104, the picture coding apparatus 100 places the parameter sets SPS, PPS before any of the pictures pic in the random access unit RAU. When coding the current picture, the picture coding apparatus 100 places the parameter set identifier PSID indicating the picture parameter set PPS necessary for decoding the picture pic before the codeword for the pixels of the picture (i.e. pixel data pix) within the coded current picture (i.e. picture pic).

After that, the picture coding apparatus 100 judges whether or not any uncoded pictures are found in the obtained image signal Vin (Step S108). When it is judged that an uncoded picture is found (Y in Step S108), the picture coding apparatus 100 operates repeatedly the operation starting from Step S100. When it is judged that no uncoded pictures are found, namely, when it is judged that all the pictures are coded (N in Step S108), the picture coding apparatus 100 terminates the processing of coding. The stream Str is generated using the picture coding method as described above.

Thus, in the picture coding method according to the present embodiment, the stream Str is generated in such a way that the sequence parameter set SPS and the picture parameter sets PPS necessary for decoding (coding) all the pictures included in the random access unit RAU are placed in the random access unit RAU. The picture decoding apparatus therefore can start decoding properly, namely, can start performing random access, by referring to the sequence parameter set SPS and the picture parameter sets PPS included in the head of the random access unit RAU in the obtained stream Str, even when the stream Str is obtained in the middle. The picture coding apparatus also does not need to shift a position of reading the data, from the head of the stream Str to the random access point, and thereby, can start performing random access swiftly by omitting the waiting time for the random access, even when random access is performed by reading the stream Str from the recording medium.

In the picture coding method according to the present embodiment, the stream Str, in which the sequence parameter set SPS and the picture parameter sets PPS are included in each random access unit RAU, is generated, therefore, a stream whose bit amount is greater than that of the stream Str9 generated using the conventional picture coding method is generated. However, a header necessary for decoding is not placed per picture as in the conventional picture coding method according to the MPEG-2. Therefore, the coding efficiency can be further improved with the present picture coding method compared to the conventional picture coding method according to the MPEG-2.

The picture coding apparatus 100 according to the present embodiment may generate structure identification information indicating a structure of the stream Str.

Figure 7:
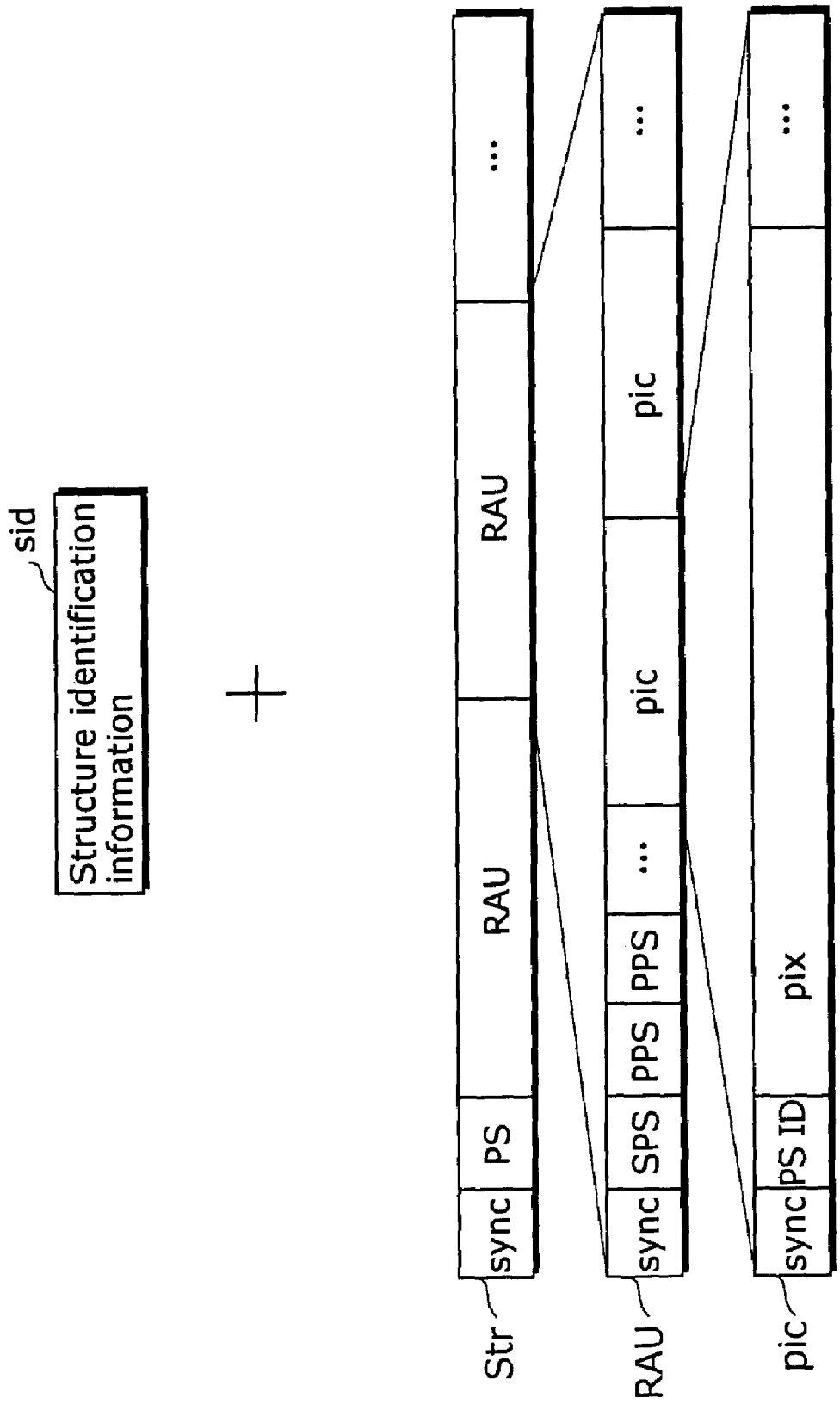
FIG. 7 is an illustration for describing the information outputted from the picture coding apparatus according to the first embodiment of the present invention.

FIG. 7 is an illustration for explaining the information outputted from the picture coding apparatus 100.

As shown in FIG. 7, the picture coding apparatus 100 generates structure identification information sid as an attachment to the stream Str and outputs it.

The structure identification information sid indicates that the sequence parameter set SPS and the picture parameter sets PPS are included in all the random access units RAU in the stream Str. That is to say that it is possible to perform random access from an arbitrary random access unit RAU in the stream Str.

The picture decoding apparatus, having obtained the stream Str and the structure identification information sid, can understand easily that the obtained stream Str can be decoded from an arbitrary random access unit RAU based on the structure identification information sid and perform random access by the fact the picture decoding apparatus attaches such structure identification information sid to the stream Str and outputs it.

The picture coding apparatus 100 may include the structure identification information sid in the stream Str and output it.

Figure 8:
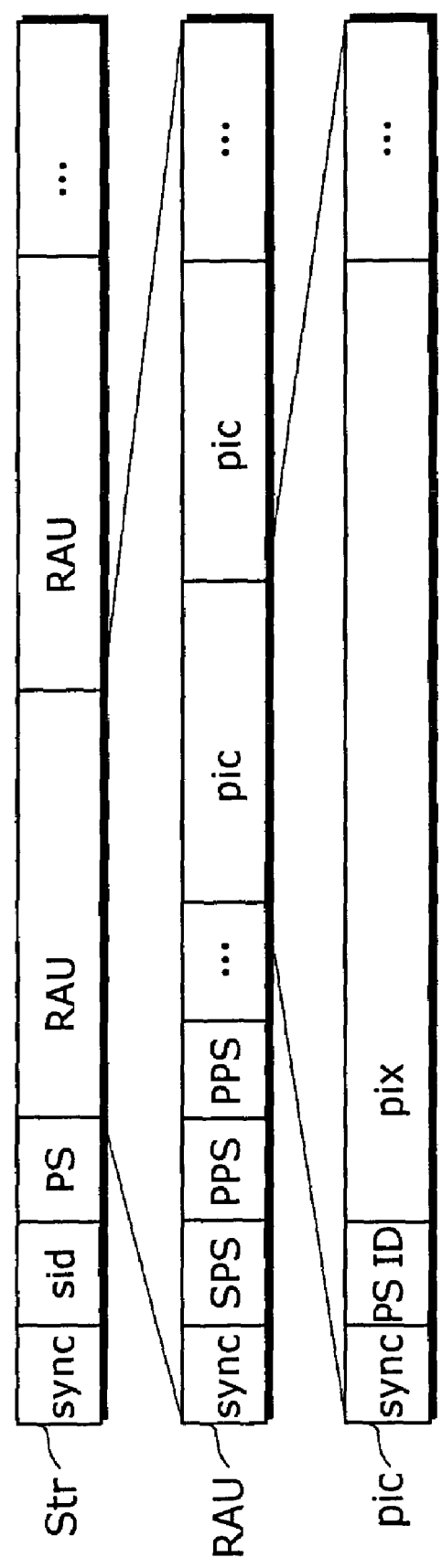
FIG. 8 is a structural diagram showing a structure of the stream Str that includes structure identification information according to the first embodiment of the present invention.

FIG. 8 is a structural diagram showing a structure of the stream Str that includes the structure identification information sid.

As shown in FIG. 8, the picture coding apparatus 100 generates a stream Str in such a way that the structure identification information sid is placed between a synchronous signal sync and a parameter set PS.

(Variation 1)

The following describes the first variation of the picture coding apparatus according to the present embodiment described above.

The picture coding apparatus according to the first variation outputs a stream in which a placement of the picture parameter set PPS is different from the stream Str outputted by the picture coding apparatus 100 according to the present embodiment described above.

Figure 9:
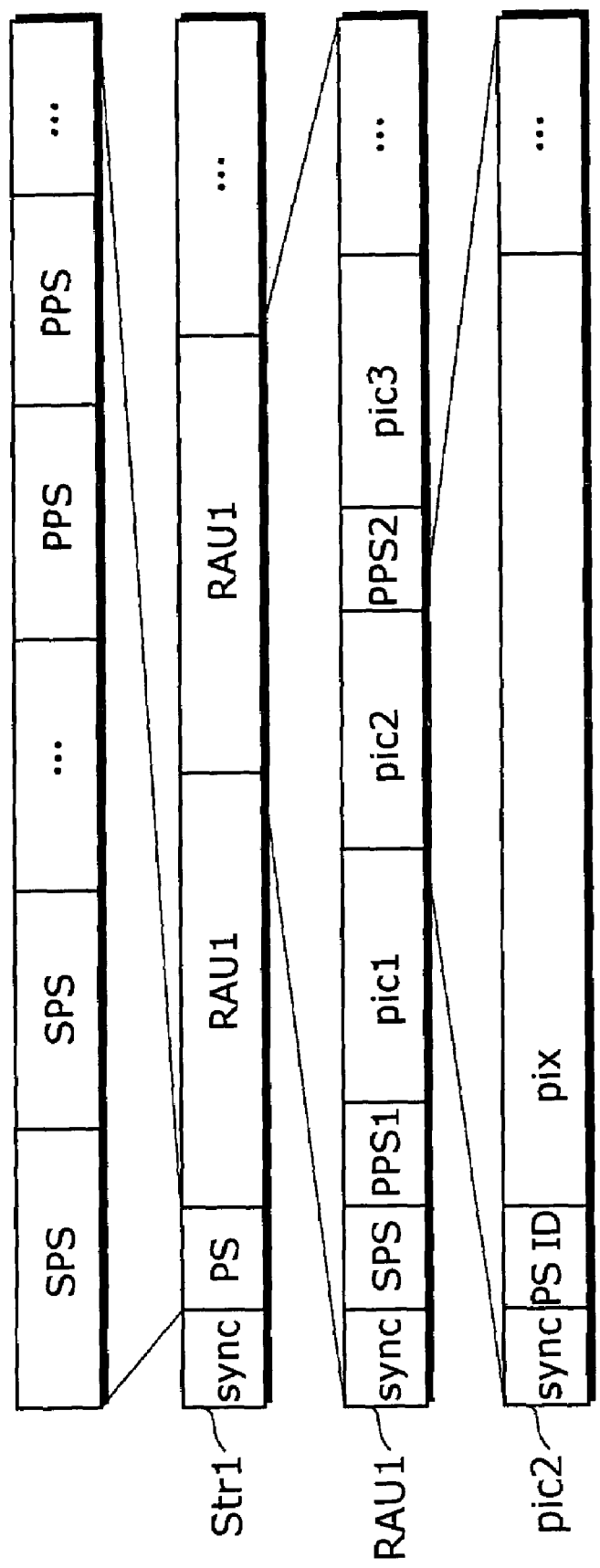
FIG. 9 is a structural diagram showing a structure of the stream outputted by the picture coding apparatus according to a first variation described in the first embodiment of the present invention.

FIG. 9 is a structural diagram showing a structure of the stream outputted by the picture coding apparatus according to the present variation.

The picture coding apparatus according to the present variation outputs a stream Str1 that includes sequentially from the head a synchronous signal sync, a parameter set PS and plural random access units RAU1.

The random access unit RAU1 includes sequentially from the head a synchronous signal sync, a sequence parameter set SPS, a picture parameter set PPS (PPS1) and two pictures pic1, pic2, a picture parameter set PPS (PPS2) and a picture pic3.

The picture parameter set PPS1 that is necessary for decoding the two pictures pic1 and pic2 is referred to by these pictures in common. The picture parameter set PPS2 that is unnecessary for decoding the pictures pic 1 and pic2 is not referred to by these pictures. That is to say, the picture parameter set PPS2 that is necessary for decoding the picture pic3 is referred to by the picture pic3.

The picture parameter set PPS2, being referred to by the picture pic3 but not by the pictures pic1 and pic2, does not need to be placed before the pictures pic1 and pic2.

The picture parameter set PPS1, being referred to by the pictures pic1 and pic2, is already placed immediately before the picture pic1, therefore, does not need to be placed immediately before the picture pic2 again.

Namely, the picture coding apparatus according to the present variation generates a stream Str1 so that the picture parameter set PPS referred to by a predetermined picture is placed immediately before the predetermined picture except for the case in which it is already placed.

Figure 10:
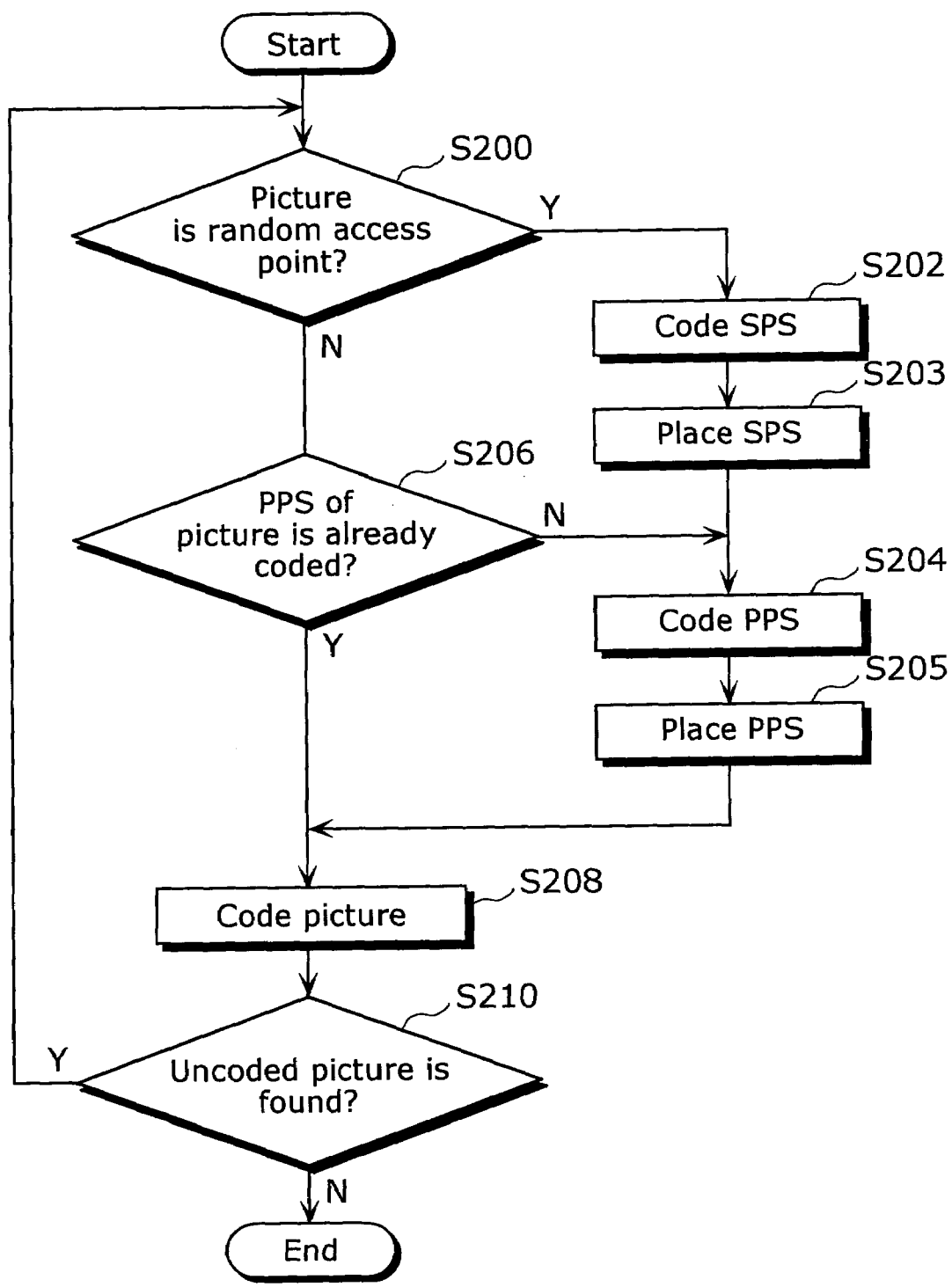
FIG. 10 is a flowchart showing an operation of the picture coding apparatus according to the first variation described in the first embodiment of the present invention.

FIG. 10 is a flowchart showing the picture coding method employed by the picture coding apparatus according to the present variation.

The picture coding apparatus firstly judges whether or not a current picture to be coded is a random access point, that is, the first picture in the random access unit RAU1 (Step S200).

When judging that the current picture is a random access point (Y in Step S200), the picture coding apparatus codes a sequence parameter set SPS (Step S202) and places it at the head side of the random access unit RAU1 (Step S203). The picture coding apparatus further codes a picture parameter set PPS of the current picture (Step S204) and places it after the sequence parameter set SPS in the random access unit RAU1 (Step S205).

When judging that the current picture is not a random access point (N in Step S200), the picture coding apparatus further judges whether or not the picture parameter set PPS of the current picture is already coded and is placed after the random access point (Step S206).

When judging in Step S206 that the picture parameter set PPS of the current picture is not coded (N in Step S206), the picture coding apparatus codes the picture parameter set PPS of the current picture and places it (Steps S204 and S205).

Either after the placement of the picture parameter set PPS of the current picture performed in Step S205 or when it is judged in Step 206 that the picture parameter set PPS of the current picture is already coded (Y in Step S206), the picture coding apparatus codes the current picture (Step S208). The picture coding apparatus places the coded current picture (i.e. picture pic) immediately after the corresponding picture parameter set PPS when coding the current picture after the placement of the picture parameter set PPS performed in Step S205. Namely, the picture coding apparatus 100 places the picture parameter set PPS immediately before the coded current picture (i.e. picture pic) in the random access unit RAU in the placement of the picture parameter set PPS performed in Step S205. When coding the current picture, the picture coding apparatus places a parameter set identifier PSID, which indicates a picture parameter set necessary for decoding the picture pic, before the codeword for the pixels of the picture (i.e. pixel data pix) in the coded current picture (i.e. picture pic).

Then, the picture coding apparatus judges whether or not any uncoded pictures are found in the obtained image signal Vin (Step S210). When it is judged that an uncoded picture is found (Y in Step S210), the picture coding apparatus executes repeatedly the operation starting from Step S200, and when it is judged that no uncoded pictures are found which means that all the pictures are coded (N in Step S210), the picture coding apparatus terminates the coding processing. The stream Str1 is generated using the picture coding method as described above.

Under the picture coding method employed by the picture coding apparatus 100 described above, since it is after the determination, per random access unit RAU, of all the picture parameter sets PPS necessary for decoding each picture that these picture parameter sets PPS are coded in a group and placed in the head of the random access unit RAU, it is necessary to temporarily store the determined plural picture parameters PPS.

In contrast, under the picture coding method according to the present variation, since the picture parameter sets PPS necessary for decoding the pictures are sequentially determined per random access unit RAU1 and the picture parameter sets PPS are coded and then placed in a random access unit, it is not necessary to store the picture parameter sets PPS as mentioned above. Therefore, the structure of the picture coding apparatus according to the present variation can be more simplified than that of the picture coding apparatus 100.

In the present embodiment and variation, the sequence parameter set SPS can be modified using a unit superior to the random access unit RAU, therefore, it is enough to place the random access unit RAU for one time.

(Variation 2)

The following describes the second variation of the picture coding apparatus according to the present embodiment.

The picture coding apparatus according to the second variation outputs a stream in which a placement of the sequence parameter set SPS is different from the placement in the stream outputted by the picture coding apparatus 100 according to the present embodiment described above.

Figure 11:
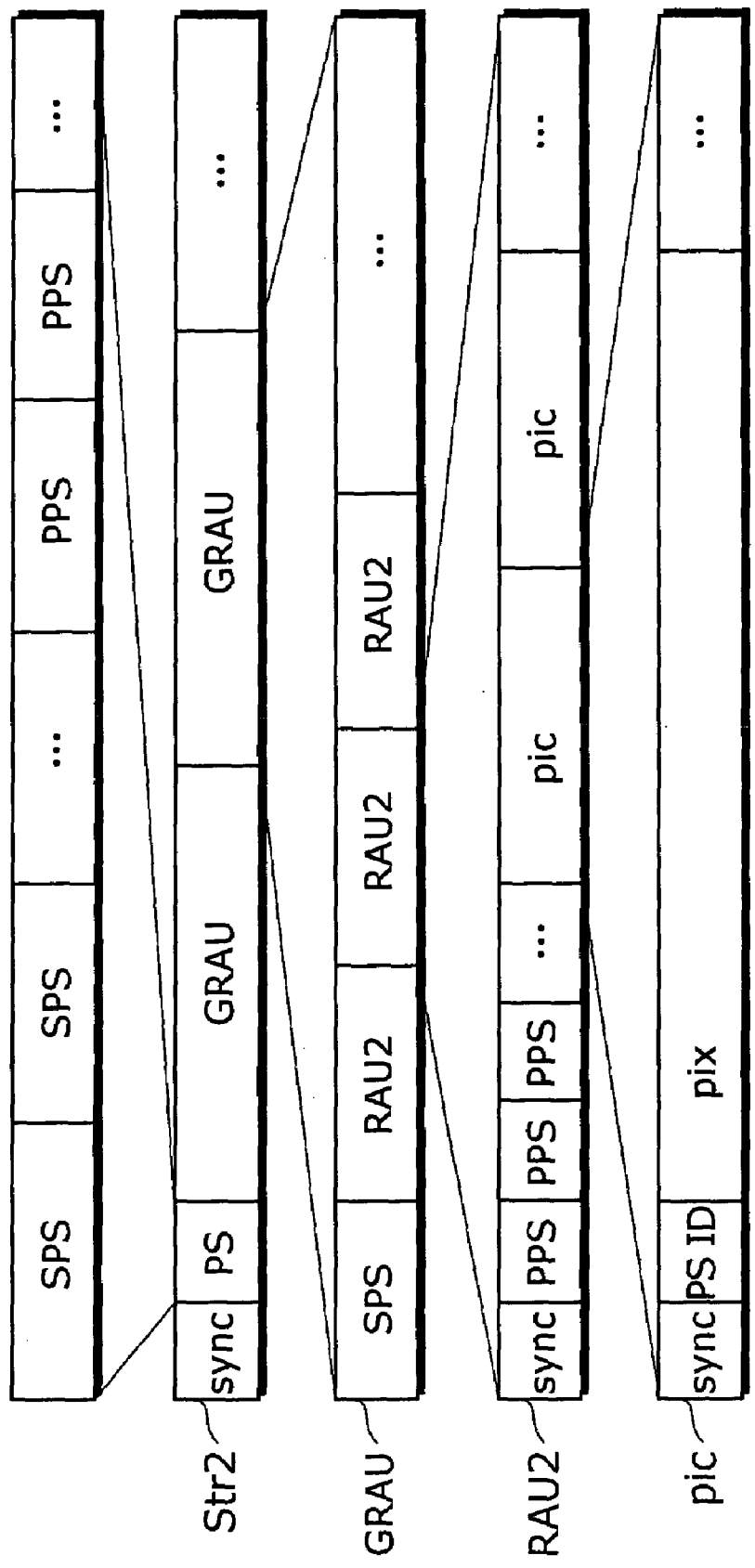
FIG. 11 is a structural diagram showing a structure of the stream outputted by the picture coding apparatus according to a second variation described in the first embodiment of the present invention.

FIG. 11 is a structural diagram showing a structure of the stream outputted by the picture coding apparatus according to the present variation.

The picture coding apparatus according to the present variation outputs a stream Str2 that includes sequentially from the head a synchronous signal sync, a parameter set PS and plural random access unit groups GRAU.

The random access unit group GRAU includes sequentially from the head a sequence parameter set SPS and plural random access units RAU2. Namely, the random access unit group GRAU is constructed as a unit assembling plural random access units RAU2 for the convenience of storage and transmission.

The sequence parameter set SPS is a parameter which can be modified using a unit superior to the random access unit RAU2. Therefore, the modification does not necessarily need to be made for each random access unit RAU2. Normally, only several sequence parameter sets SPS are required in the stream, and in many cases, only one sequence parameter set is enough.

The picture coding apparatus according to the present variation does not place a sequence parameter set SPS for each random access unit RAU2, but for each random access unit group GRAU, that is, to place a single sequence parameter set SPS in the head of each random access unit group GRAU.

The random access unit group GRAU includes a sequence parameter set SPS and a picture parameter set PPS which are necessary for decoding all the pictures included in it, therefore, the random access unit group GRAU is identifiable as the random access unit RAU or RAU1 according to the embodiment and the variation 1 described above. The RAU2 included in such random access unit group GRAU can be regarded as a subunit obtained by dividing the random access unit group GRAU.

Figure 12:
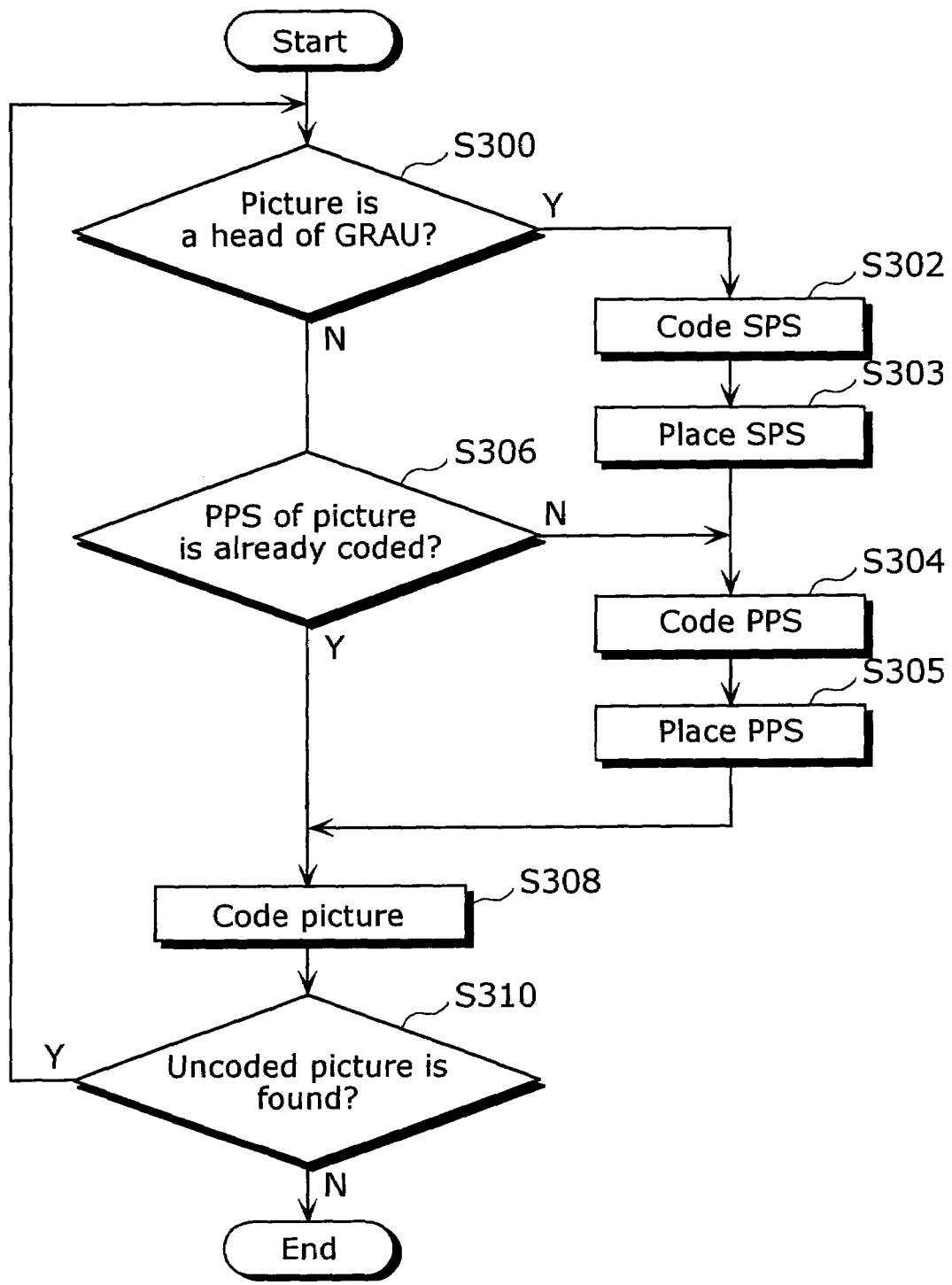
FIG. 12 is a flowchart showing an operation of the picture coding apparatus according to the second variation described in the first embodiment.

FIG. 12 is a flowchart showing an operation of the picture coding apparatus according to the present variation.

The picture coding apparatus firstly judges whether or not a current picture to be coded is the first picture included in the random access unit group GRAU (Step S300).

When judging that the current picture is the first picture (Y in Step S300), the picture coding apparatus codes a sequence parameter set SPS (Step S302) and places it at the head side of the random access unit group GRAU (Step S303). The picture coding apparatus further codes the picture parameter set PPS of the current picture (Step S304) and places it at the head side of the random access unit RAU2 (Step S305).

When judging that the current picture is not the first picture included in the random access unit group GRAU (N in Step S300), the picture coding apparatus further judges whether or not the picture parameter set PPS of the current picture is already coded and is placed after the random access point (i.e., a head of the random access unit RAU2) (Step S306).

When it is judged in Step S306 that the picture parameter set PPS of the current picture is not coded (N in Step S306), the picture coding apparatus codes the picture parameter set PPS of the current picture and places it (Steps S304 and S305).

Either after the placement of the picture parameter set PPS performed in Step S305 or when judging in Step S306 that the picture parameter set PPS of the current picture is already coded (N in Step S 306), the picture coding apparatus codes the current picture (Step S308).

The picture coding apparatus then judges whether or not any uncoded pictures are found in the obtained image signal Vin (Step S310). When judging that an uncoded picture is found (Y in Step S310), the picture coding apparatus executes repeatedly the operation starting from Step S300. When judging that no uncoded pictures are found (N in Step S310), the picture coding apparatus terminates the coding processing. The stream Str2 in which only one sequence parameter set SPS is included in each random access unit group GRAU is generated using the picture coding method described above.

Thus, the picture coding apparatus according to the present variation generates the stream Str2 in which a single sequence parameter set SPS is placed for plural random access units RAU2. The bit amount included in the stream Str2 therefore can be reduced more than the bit amount included in the stream Str generated by the picture coding apparatus 100 described above.

In the variations 1 and 2 described in the present embodiment, a coded parameter set PS (i.e. PPSs and SPSs) is placed at the head side of the stream, however, it may not be placed as such since it is placed, as necessary, in each random access unit RAU.

(Variation 3)

The following describes the third variation of the picture coding apparatus according to the present embodiment described above.

The picture coding apparatus according to the third variation generates and outputs a stream different from the stream outputted by the picture coding apparatus 100 according to the present embodiment described above.

Figure 13:
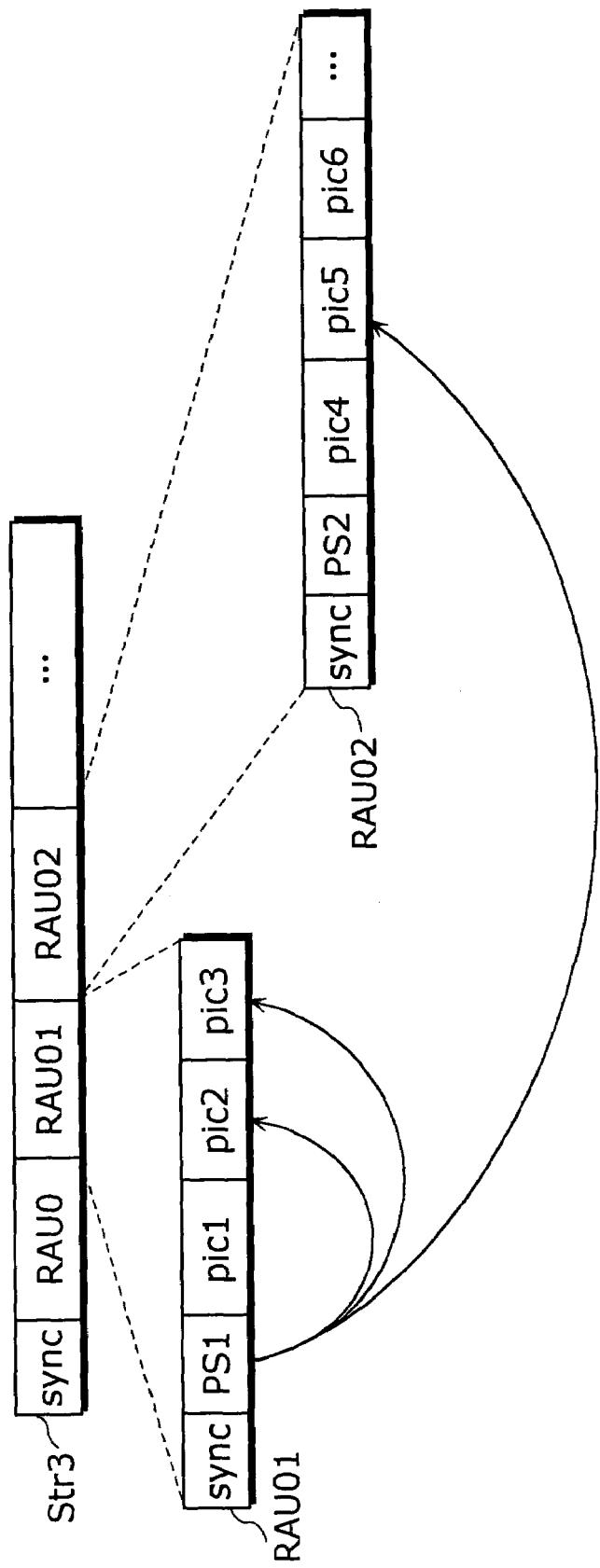
FIG. 13 is a structural diagram showing a structure of the stream outputted by the picture coding apparatus according to a third variation of the first embodiment.

FIG. 13 is a structural diagram showing a structure of the stream outputted by the picture coding apparatus according to the present variation.

The picture coding apparatus according to the present variation outputs a stream Str3 that includes sequentially from the head a synchronous signal sync and plural random access units RAU (RAU0, RAU01, RAU02, . . . ).

The random access unit RAU01 includes sequentially from the head a synchronous signal sync, a parameter set PS (PS1), pictures pic1, pic2 and pic3. The random access unit RAU2 includes sequentially from the head a synchronous signal sync, random access point information RPS, a parameter set PS (PS2), pictures pic4, pic5 and pic6.

For example, the picture pic1 is an I-picture that is intra-picture coded whereas the picture pic2 is a P-picture that is coded with reference to the picture pic1. The picture pic3 is a B-picture that is coded with reference to the pictures pic1 and pic2. The picture pic4 is an I-picture that is intra-picture coded whereas the picture pic5 is a B-picture that is coded with reference to the pictures pic2 and pic4. The picture pic6 is a B-picture that is coded with reference to the picture pic4 and other pictures in the random access unit RAU02.

The parameter set PS1 includes a sequence parameter set, picture parameter sets for the pictures pic2 and pic3 and a picture parameter set for the picture pic5 that is included in the random access unit RAU02.

Namely, the picture pic2 is decoded with reference to the parameter set PS1 and the picture pic1 whereas the picture pic3 is decoded with reference to the parameter set PS1 and the pictures pic1 and pic2, when random access is performed on the stream Str3 starting from the random access unit RAU01. Then, the picture pics included in the random access unit RAU02 is decoded with reference to the parameter set PS1 and the pictures pic2 and pic4 whereas the picture pic6 is decoded with reference to the parameter set PS2, the picture pic4 and other pictures included in the random access unit RAU02.

When random access is performed on the stream Str3 starting from the random access unit RAU02, the picture pic5 is neither decoded nor displayed whereas the pictures pic4 and pic6 are sequentially decoded and then displayed.

Namely, there is no need to place the picture parameter set necessary for the picture pic5 in the random access unit RAU02 since the decoding of the picture pic5, a B-picture, included in the random access unit RAU02 needs to refer to the pictures included in the previous random access unit RAU01. Even when random access is performed on the stream Str3 starting from the random access unit RAU02, the picture pic5 is not decoded. Therefore, there is no need to place, in the random access unit RAU02, the picture parameter set necessary for the picture pic5, as described above.

In the variations 1-3 of the present embodiment described above, a parameter set identifier PSID is included in the stream on a picture-by-picture basis. However, when the picture is composed of plural slices, a parameter set identifier PSID may be included on a slice-by-slice basis.

The random access unit shown in the embodiment and the variations 1-3 described above does not necessarily have to be a group of pictures including a picture of the special type defined by the JVT. It may be a group of pictures including simply an intra-picture coded picture (I-picture) in the head because of the fact that a parameter set PS is placed for each random access unit RAU as necessary.

Furthermore, in the embodiment and the variations 1-3 described above, a single sequence parameter set SPS and plural picture parameter sets PPS that are different from one another are coded for one time and placed for each random access unit RAU or each random access unit group GRAU. By performing coding on these parameter sets for plural times, however, a plurality of the same coded sequence parameter sets SPS and a plurality of the same coded picture parameter sets PPS may be placed for each random access unit RAU or each random access unit group GRAU. Consequently, errors can be prevented, for example, at the time of decoding.

Second Embodiment

Furthermore, the processing illustrated in the above embodiment can be carried out easily in an independent computer system by recording a program for realizing the picture coding method described in the above embodiment onto a recording medium such as a flexible disk or the like.

Figure 14A:
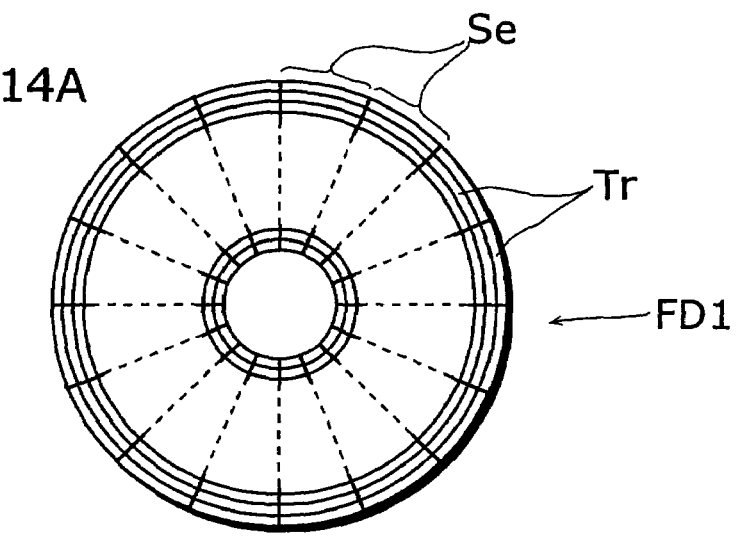
FIGS. 14A, 14B and 14C are illustrations of a recording medium on which a program for realizing the picture coding method according to the first embodiment of the present invention in a computer system is recorded, according to the second embodiment of the present invention.
Figure 14B:
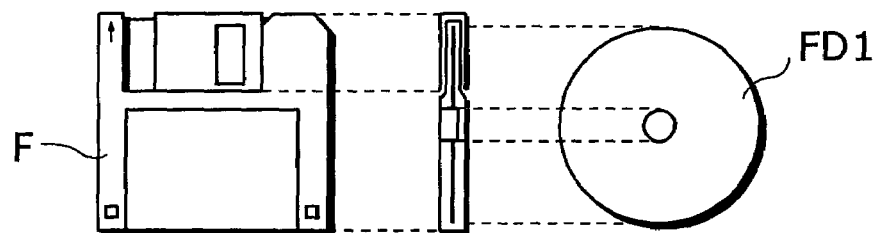
Figure 14C:
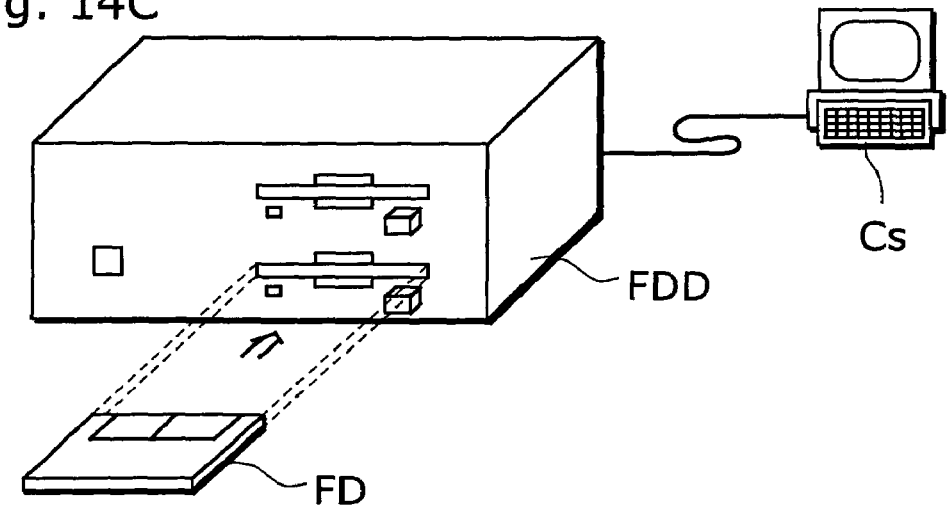

FIGS. 14A, 14B and 14C are illustrations of a recording medium, on which a program for carrying out the picture coding method described in the first embodiment in the computer system is recorded.

FIG. 14B shows a full appearance of a flexible disk FD, its structure at cross section and a full appearance of the disk itself FD1 as a main body of a recording medium whereas FIG. 14A shows an example of a physical format of the flexible disk FD1.

The disk FD1 is contained in a case F with a plurality of tracks Tr formed concentrically from the periphery to the inside on the surface of the disk FD1, and each track is divided into 16 sectors Se in the angular direction. Thus, the picture coding method as the program mentioned above is recorded in an area assigned for it on the disk FD1.

FIG. 14C shows a structure for recording and reading out the program on the flexible disk FD.

When the program is recorded on the flexible disk FD, the computer system Cs writes in the picture coding method as the program mentioned above via a flexible disk drive FDD. When the picture coding method is constructed in the computer system Cs using the program on the flexible disk FD, the program is read out from the flexible disk FD and then transferred to the computer system Cs by the flexible disk drive FDD.

In the above explanation, the flexible disk FD is used as an example of a recording medium, but the same processing can also be performed using an optical disk. In addition, the recording medium is not limited to these mentioned above, but any other medium capable of recording a program such as an IC card and a ROM cassette can be employed.

Third Embodiment

The following is a description for the application of the picture coding method illustrated in the above-mentioned embodiment and a system using the method.

Figure 15:
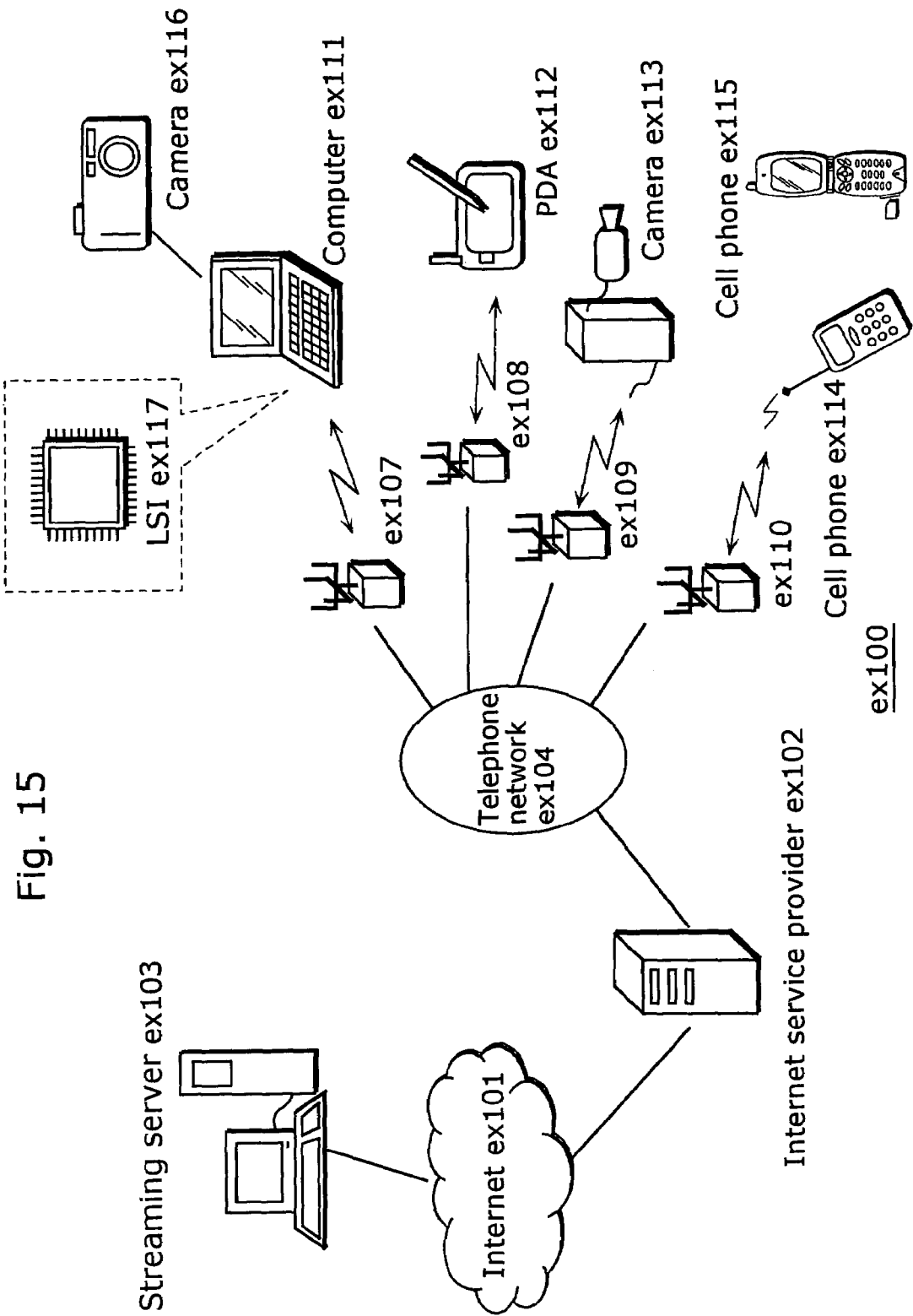
FIG. 15 is a block diagram showing a whole structure of a content supply system for realizing a content distribution service according to the third embodiment of the present invention.

FIG. 15 is a block diagram showing an overall configuration of a content supply system ex100 for realizing content delivery service. The area for providing communication service is divided into cells of desired size, and cell sites ex107-ex110, which are fixed wireless stations, are placed in respective cells.

This content supply system ex100 is connected to apparatuses such as a computer ex111, a Personal Digital Assistant (PDA) ex112, a camera ex113, a cell phone ex114 and a cell phone with a camera ex115 via, for example, Internet ex101, an Internet service provider ex102, a telephone network ex104, as well as the cell sites ex107-ex110.

However, the content supply system ex100 is not limited to the configuration shown in FIG. 15 and may be connected to a combination of any of them. Also, each apparatus may be connected directly to the telephone network ex104, not through the cell sites ex107-ex110.

The camera ex113 is an apparatus capable of shooting video such as a digital video camera. The cell phone ex114 may be a cell phone of any of the following system: a Personal Digital Communications (PDC) system, a Code Division Multiple Access (CDMA) system, a Wideband-Code Division Multiple Access (W-CDMA) system or a Global System for Mobile Communications (GSM) system, a Personal Handyphone System (PHS) or the like.

A streaming server ex103 is connected to the camera ex113 via the telephone network ex104 and also the cell site ex109, which realizes a live distribution or the like using the camera ex113 based on the coded data transmitted from the user. Either of the camera ex113, the server which transmits the data and the like may code the data. The moving picture data shot by a camera ex116 may be transmitted to the streaming server ex103 via the computer ex111. In this case, either the camera ex116 or the computer ex111 may code the moving picture data. An LSI ex117 included in the computer ex111 and the camera ex116 performs the coding processing. Software for coding and decoding pictures may be integrated into any type of recording medium (such as a CD-ROM, a flexible disk and a hard disk) that is a recording medium which is readable by the computer ex111 or the like. Furthermore, a cell phone with a camera ex115 may transmit the moving picture data. This moving picture data is the data coded by the LSI included in the cell phone ex115.

The content supply system ex100 codes contents (such as a music live video) shot by a user using the camera ex113, the camera ex116 or the like in the same way as shown in the above-mentioned embodiment and transmits them to the streaming server ex103, while the streaming server ex103 makes stream delivery of the content data to the clients at their requests. The clients include the computer ex111, the PDA ex112, the camera ex113, the cell phone ex114 and so on capable of decoding the above-mentioned coded data. In the content supply system ex100, the clients can thus receive and reproduce the coded data, and can further receive, decode and reproduce the data in real time so as to realize personal broadcasting.

When each apparatus in this system performs coding or decoding, the picture coding apparatus or the picture decoding apparatus shown in the above-mentioned embodiment can be used.

A cell phone will be explained as an example of such apparatus.

Figure 16:
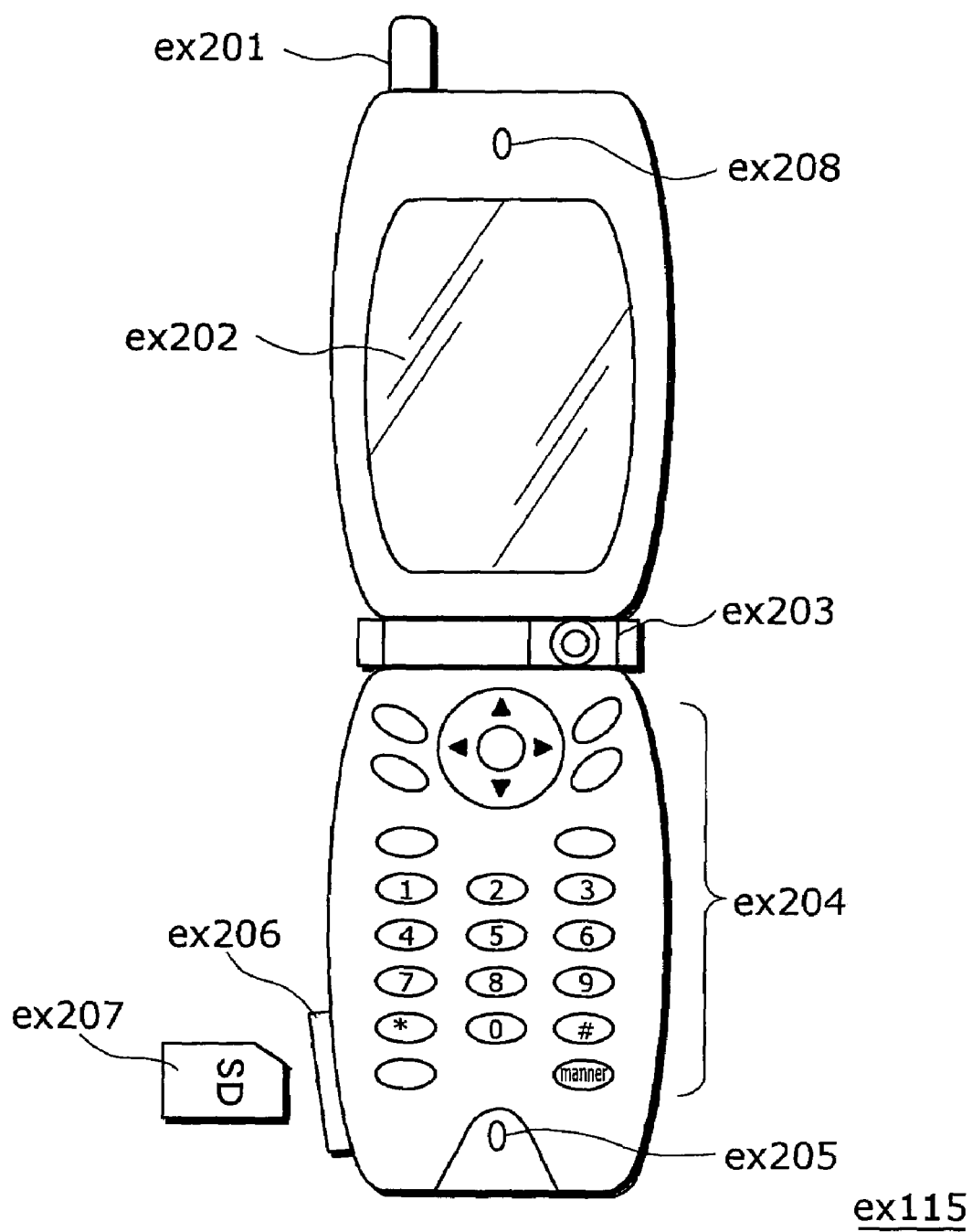
FIG. 16 is a diagram showing a cell phone according to the third embodiment of the present invention using the picture coding method described in the first embodiment.

FIG. 16 is a diagram showing the cell phone ex115 using the picture coding method explained in the above-mentioned embodiment. The cell phone ex115 has an antenna ex201 for communicating with the cell site ex110 via radio waves, a camera unit ex203 such as a CCD camera capable of shooting moving and still pictures, a display unit ex202 such as a liquid crystal display for displaying the data such as decoded pictures and the like shot by the camera unit ex203 or received by the antenna ex201, a body unit including a set of operation keys ex204, a voice output unit ex208 such as a speaker for outputting voice, a voice input unit ex205 such as a microphone for inputting voice, a recording medium ex207 for recording coded or decoded data such as data of moving or still pictures shot by the camera, data of received e-mails and that of moving or still pictures, and a slot unit ex206 for attaching the recording medium ex207 to the cell phone ex115. The recording medium ex207 stores in itself a flash memory element, a kind of Electrically Erasable and Programmable Read Only Memory (EEPROM) that is a nonvolatile memory electrically erasable from and rewritable to a plastic case such as an SD card.

Next, the cell phone ex115 will be explained with reference to FIG. 17. In the cell phone ex115, a main control unit ex311, designed in order to control overall each unit of the main body which contains the display unit ex202 as well as the operation keys ex204, is connected mutually to a power supply circuit unit ex310, an operation input control unit ex304, a picture coding unit ex312, a camera interface unit ex303, a Liquid Crystal Display (LCD) control unit ex302, a picture decoding unit ex309, a multiplexing/demultiplexing unit ex308, a read/write unit ex307, a modem circuit unit ex306 and a voice processing unit ex305 via a synchronous bus ex313.

When a call-end key or a power key is turned ON by a user's operation, the power supply circuit unit ex310 supplies the respective units with power from a battery pack so as to activate the digital cell phone with a camera ex115 as a ready state.

In the cell phone ex115, the voice processing unit ex305 converts the voice signals received by the voice input unit ex205 in conversation mode into digital voice data under the control of the main control unit ex311 including a CPU, ROM and RAM, the modem circuit unit ex306 performs spread spectrum processing for the digital voice data, and the communication circuit unit ex301 performs digital-to-analog conversion and frequency conversion for the data, so as to transmit it via the antenna ex201. Also, in the cell phone ex115, the communication circuit unit ex301 amplifies the data received by the antenna ex201 in conversation mode and performs frequency conversion and the analog-to-digital conversion to the data, the modem circuit unit ex306 performs inverse spread spectrum processing of the data, and the voice processing unit ex305 converts it into analog voice data so as to output it via the voice output unit ex208.

Furthermore, when transmitting an e-mail in data communication mode, the text data of the e-mail inputted by operating the operation keys ex204 of the main body is sent out to the main control unit ex311 via the operation input control unit ex304. In the main control unit ex311, after the modem circuit unit ex306 performs spread spectrum processing of the text data and the communication circuit unit ex301 performs the digital-to-analog conversion and the frequency conversion for the text data, the data is transmitted to the cell site ex110 via the antenna ex201.

When picture data is transmitted in data communication mode, the picture data shot by the camera unit ex203 is supplied to the picture coding unit ex312 via the camera interface unit ex303. When it is not transmitted, it is also possible to display the picture data shot by the camera unit ex203 directly on the display unit ex202 via the camera interface unit ex303 and the LCD control unit ex302.

The picture coding unit ex312, which includes the picture coding apparatus as described for the present invention, compresses and codes the picture data supplied from the camera unit ex203 using the coding method employed by the picture coding apparatus as shown in the embodiment mentioned above so as to transform it into coded image data, and sends it out to the multiplexing/demultiplexing unit ex308. At this time, the cell phone ex115 sends out the voice received by the voice input unit ex205 during the shooting with the camera unit ex203 to the multiplexing/demultiplexing unit ex308 as digital voice data via the voice processing unit ex305.

The multiplexing/demultiplexing unit ex308 multiplexes the coded image data supplied from the picture coding unit ex312 and the voice data supplied from the voice processing unit ex305, using a predetermined method, then the modem circuit unit ex306 performs spread spectrum processing of the multiplexed data obtained as a result of the multiplexing, and lastly the communication circuit unit ex301 performs digital-to-analog conversion and frequency transform of the data for the transmission via the antenna ex201.

As for receiving data of a moving picture file which is linked to a Web page or the like in data communication mode, the modem circuit unit ex306 performs inverse spread spectrum processing for the data received from the cell site ex110 via the antenna ex201, and sends out the multiplexed data obtained as a result of the inverse spread spectrum processing.

In order to decode the multiplexed data received via the antenna ex201, the multiplexing/demultiplexing unit ex308 demultiplexes the multiplexed data into a bit stream of image data and that of voice data, and supplies the coded image data to the picture decoding unit ex309 and the voice data to the voice processing unit ex305, respectively via the synchronous bus ex313.

Next, the picture decoding unit ex309, including the picture decoding apparatus as described for the present invention, decodes the bit stream of the image data using the decoding method corresponding to the coding method as shown in the above-mentioned embodiments to generate reproduced moving picture data, and supplies this data to the display unit ex202 via the LCD control unit ex302, and thus the image data included in the moving picture file linked to a Web page, for instance, is displayed. At the same time, the voice processing unit ex305 converts the voice data into analog voice data, and supplies this data to the voice output unit ex208, and thus the voice data included in the moving picture file linked to a Web page, for instance, is reproduced.

Figure 18:
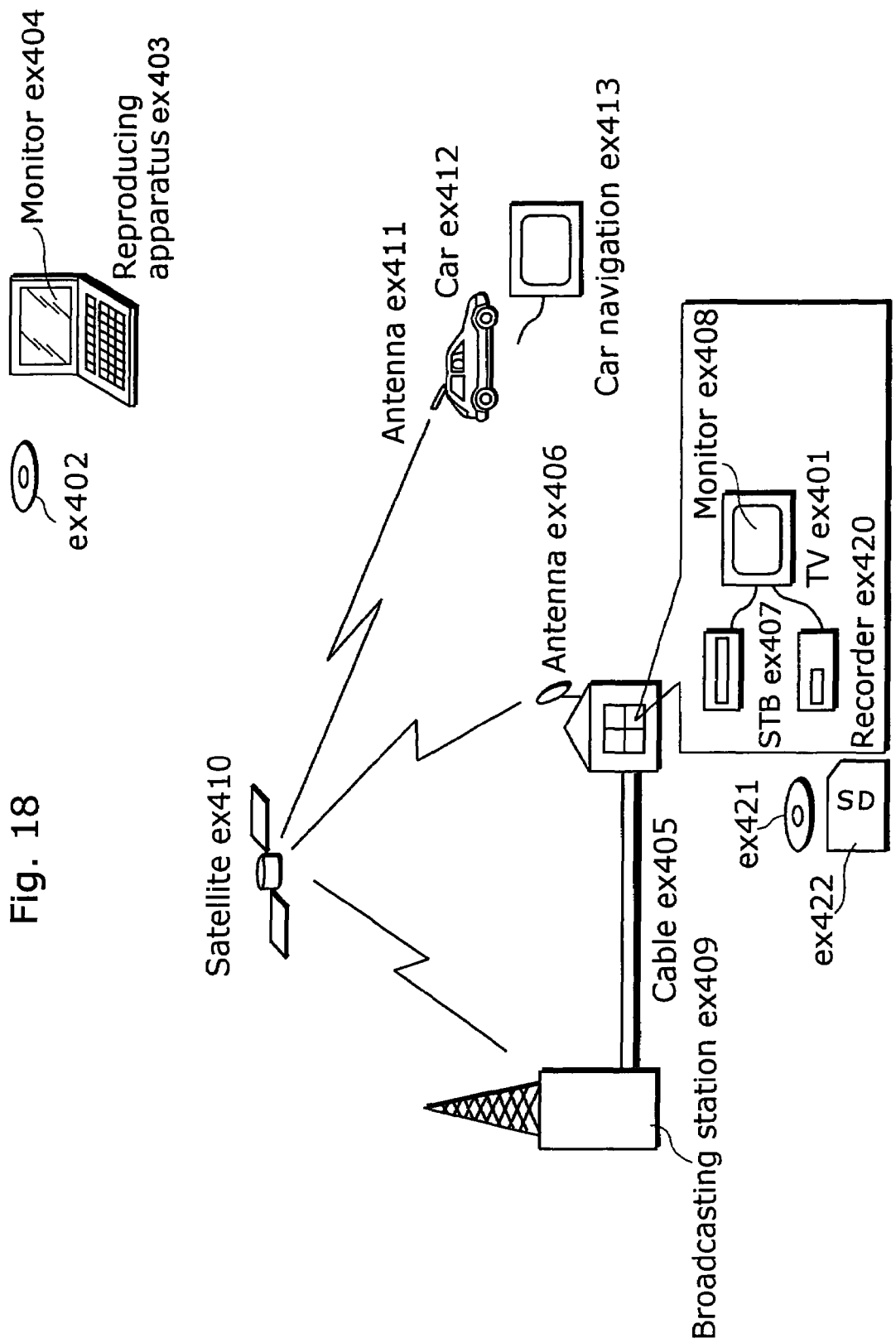
FIG. 18 is a structural diagram showing the structure of the digital broadcasting system according to the third embodiment of the present invention.

The present invention is not limited to the above-mentioned system since ground-based or satellite digital broadcasting has been in the news lately and at least either the picture coding apparatus or the picture decoding apparatus described in the above-mentioned embodiment can be incorporated into a digital broadcasting system as shown in FIG. 18. More specifically, a bit stream of video information is transmitted from a broadcast station ex409 to or communicated with a broadcast satellite ex410 via radio waves. Upon receipt of it, the broadcast satellite ex410 transmits radio waves for broadcasting. Then, a home-use antenna ex406 with a satellite broadcast reception function receives the radio waves, and a television (receiver) ex401 or a set top box (STB) ex407 decodes a coded bit stream for reproduction. The picture decoding apparatus as shown in the above-mentioned embodiment can be implemented in the reproducing apparatus ex403 for reading out and decoding the bit stream recorded on a recording medium ex402 such as a CD and a DVD. In this case, the reproduced moving picture signals are displayed on a monitor ex404. It is also conceivable to implement the picture decoding apparatus in the set top box ex407 connected to a cable ex405 for a cable television or the antenna ex406 for satellite and/or ground-based broadcasting so as to reproduce them on a monitor ex408 of the television ex401. The picture decoding apparatus may be incorporated into the television, not in the set top box. Also, a car ex412 having an antenna ex411 can receive signals from the satellite ex410 or the cell site ex107 for replaying moving picture on a display device such as a car navigation system ex413 set in the car ex412.

Furthermore, the picture coding apparatus as shown in the above-mentioned embodiment can code picture signals and record them on the recording medium. As a concrete example, a recorder ex420 such as a DVD recorder for recording picture signals on a DVD disk ex421, a disk recorder for recording them on a hard disk can be cited. They can be recorded on an SD card ex422. When the recorder ex420 includes the picture decoding apparatus as shown in the above-mentioned embodiment, the picture signals recorded on the DVD disk ex421 or the SD card ex422 can be reproduced for display on the monitor ex408.

Figure 17:
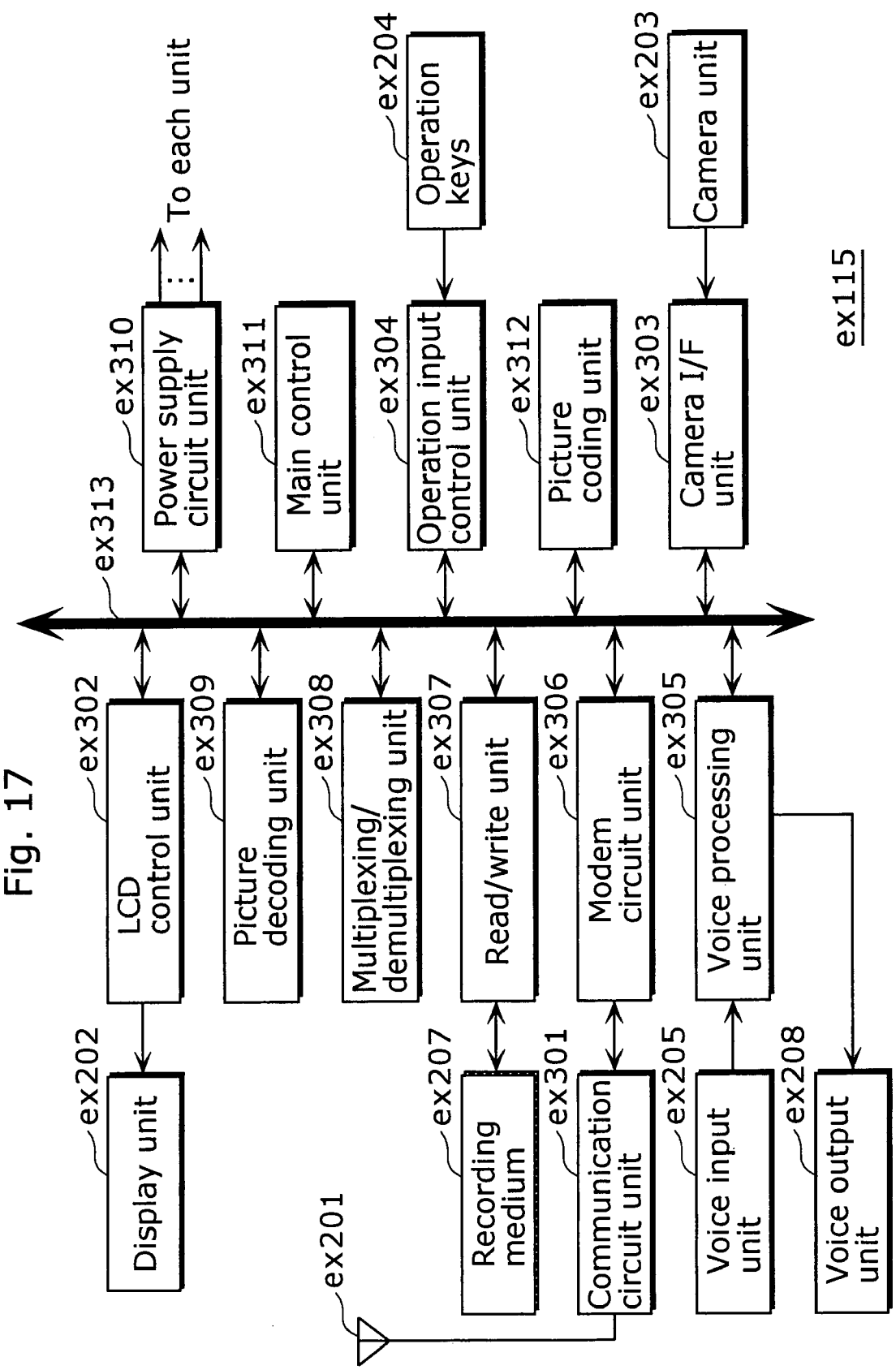
FIG. 17 is a block diagram showing the internal structure of the cell phone according to the third embodiment of the present invention.

As for the structure of the car navigation system ex413, the structure without the camera unit ex203, the camera interface unit ex303 and the picture coding unit ex312, out of the components shown in FIG. 17, is conceivable. The same applies for the computer ex111, the television (receiver) ex401 and others.

In addition, three types of implementations can be conceived for a terminal such as the cell phone ex114: a sending/receiving terminal implemented with both an encoder and a decoder, a sending terminal implemented with an encoder only, and a receiving terminal implemented with a decoder only.

As described above, it is possible to use the picture coding method described in the above-mentioned embodiment for any of the above-mentioned apparatuses and systems, and by thus doing, the effects described in the above-mentioned embodiment can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The picture coding method according to the present invention allows coding of pictures so that random access can be performed without reducing the coding efficiency. The present picture coding method can be employed by a picture coding apparatus, such as a video camera, a cell phone with a recording function, or the like, which codes pictures using the method.

The invention claimed is:

1. A moving picture coding method for generating a coded stream by coding a moving picture signal on a picture-by-picture basis, wherein said moving picture coding method comprises the following steps performed when coding a current picture to be coded which is included in a random access unit including: pictures belonging to a group of pictures starting with a first I-picture which is a first random access point and ending with a picture located immediately-before a second I-picture which is a second random access point; and parameter sets for decoding pictures in the random access unit, the current picture being located after the first I-picture in coding order, said moving picture coding method comprising:

a first coding step of coding a parameter set selected for decoding the current picture to be coded;

a second coding step of coding the current picture to be coded based on the contents included in the selected parameter set; and a coded stream generating step of generating a coded stream so that the selected and coded parameter set is located before the coded first I-picture in the random access unit including the first I-picture, the selected and coded parameter set being unnecessary for the first I-picture.

2. A moving picture decoding method for generating a moving picture signal by decoding a coded stream generated by coding a random access unit including: pictures belonging to a group of pictures starting with a first I-picture which is a first random access point and ending with a picture located immediately-before a second I-picture which is a second random access point; and parameter sets for decoding pictures in the random access unit, said moving picture decoding method comprising:

an extracting step of extracting a coded first parameter set located before a coded first I-picture in the random access unit including the first I-picture;

a parameter set decoding step of decoding the coded first parameter set extracted in said extracting step; and a picture decoding step of decoding, using the decoded first parameter set, a current coded picture to be decoded which is included in the random access unit and which is located after the first I-picture in coding order.

3. A moving picture decoding method according to claim 2, further comprising:
- a second extracting step of extracting a coded second parameter set located before the coded first I-picture in the random access unit including the first I-picture;
- a second parameter set decoding step of decoding the coded second parameter set; and
- a second picture decoding step of decoding, using the decoded second parameter set, the current coded I-picture to be decoded.

4. A recording method for recording a coded stream in which a video signal is coded on a picture-by-picture basis, onto a computer-readable recording medium, wherein said recording method comprises the following steps performed when coding a current picture to be coded which is included in a random access unit including: pictures belonging to a group of pictures starting with a first I-picture which is a first random access point and ending with a picture located immediately-before a second I-picture which is a second random access point; and parameter sets for decoding pictures in the random access unit, the current picture being located after the first I-picture in coding order, said recording method comprising:
- a first coding step of coding a parameter set selected for decoding the current picture to be coded;
- a second coding step of coding the current picture to be coded based on the contents included in the selected parameter set; and
- a coded stream generating step of generating a coded stream so that the selected and coded parameter set is located before the coded first I-picture in the random access unit including the first I-picture, the selected and coded parameter set being unnecessary for the first I-picture; and
- a recording step of recording the coded stream onto the recording medium.

* * * * *